(12) United States Patent
Brennan et al.

(10) Patent No.: US 8,568,551 B2
(45) Date of Patent: Oct. 29, 2013

(54) PRE-PATTERNED LAYUP KIT AND METHOD OF MANUFACTURE

(75) Inventors: Joseph D. Brennan, Shoreline, WA (US); George D. Hempstead, Camano Island, WA (US); Darrell D. Jones, Mill Creek, WA (US); Matthew K. Lum, Mercer Island, WA (US); Peter D. McCowin, Enumclaw, WA (US); Terrence J. Rowe, Seattle, WA (US); Hugh R. Schlosstein, Renton, WA (US)

(73) Assignee: The Boeing Company, Chicago, IL (US)

( * ) Notice: Subject to any disclaimer, the term of this patent is extended or adjusted under 35 U.S.C. 154(b) by 1122 days.

(21) Appl. No.: 11/751,931

(22) Filed: May 22, 2007

(65) Prior Publication Data

US 2010/0012260 A1    Jan. 21, 2010

(51) Int. Cl.
 *B32B 37/10* (2006.01)
(52) U.S. Cl.
 USPC .......................................... 156/285; 156/289
(58) Field of Classification Search
 USPC ......... 156/250, 285, 247, 289, 323, 523, 577, 156/286, 232
 See application file for complete search history.

(56) References Cited

U.S. PATENT DOCUMENTS

| | | | |
|---|---|---|---|
| 2,374,894 A | 5/1945 | Pioch et al. | |
| 2,679,278 A | 5/1954 | Clark | |
| 3,739,166 A | 6/1973 | Anderson | |
| 3,983,282 A | 9/1976 | Seemann, III | |
| 4,015,035 A | 3/1977 | Blad et al. | |
| 4,016,022 A | 4/1977 | Browning et al. | |
| 4,049,484 A | 9/1977 | Priest et al. | |
| 4,120,632 A | 10/1978 | Stoeberl | |
| 4,132,755 A | 1/1979 | Johnson | |
| 4,208,238 A * | 6/1980 | August et al. ................. | 156/510 |
| 4,238,539 A | 12/1980 | Yates et al. | |

(Continued)

FOREIGN PATENT DOCUMENTS

| | | |
|---|---|---|
| DE | 102004046520 A1 | 4/2005 |
| EP | 0230682 A2 | 8/1987 |

(Continued)

OTHER PUBLICATIONS

Korea Patent Office action dated Jun. 11, 2010 for application 2008-47564.

(Continued)

*Primary Examiner* — Katarzyna Wyrozebski Lee
*Assistant Examiner* — Scott W Dodds
(74) *Attorney, Agent, or Firm* — Yee & Associates, P.C.

(57) ABSTRACT

A pre-patterned layup kit with layup patterned to accommodate an airframe topological feature, trimmed to fit a preselected target region of a layup structure, and conformed to the target region contour. The kit can be fabricated in advance of airframe manufacture and stored until use. The kit includes a flexible carrier upon which the layup is laid, and a release layer between the layup and the carrier. The layup has multiple laminae oriented to an carrier indexing element, and indexed to the target region thereby. A kit manufacturing method includes preparing the laminae constituent of the layup, preparing the carrier, and laying down the laminae on the carrier to make the kit. The kit can be compacted, inspected, and prepared for storage. The layup can be fabricated of a pre-patterned lamina or multiple laminae that are shaped and trimmed to accommodate an airframe topological feature.

18 Claims, 9 Drawing Sheets

(56) References Cited

U.S. PATENT DOCUMENTS

| | | | |
|---|---|---|---|
| 4,287,015 A | 9/1981 | Danner, Jr. | |
| 4,476,797 A | 10/1984 | Ivanov et al. | |
| 4,491,081 A | 1/1985 | Ivanov | |
| 4,491,493 A | 1/1985 | Eaton | |
| 4,496,412 A | 1/1985 | Ritter | |
| 4,548,859 A | 10/1985 | Kline et al. | |
| 4,554,036 A | 11/1985 | Newsom | |
| 4,564,543 A | 1/1986 | Ritter | |
| 4,588,626 A | 5/1986 | Cologna et al. | |
| 4,622,091 A | 11/1986 | Letterman | |
| 4,698,115 A | 10/1987 | Dodds | |
| 4,741,943 A | 5/1988 | Hunt | |
| 4,824,513 A | 4/1989 | Dodds | |
| 4,875,962 A | 10/1989 | Breakspear | |
| 4,902,215 A | 2/1990 | Seemann, III | |
| 4,917,353 A | 4/1990 | Riley | |
| 4,934,199 A * | 6/1990 | Avila et al. | 73/863 |
| 4,942,013 A * | 7/1990 | Palmer et al. | 264/511 |
| 4,945,488 A | 7/1990 | Carver et al. | |
| 4,961,799 A | 10/1990 | Cologna et al. | |
| 4,987,700 A | 1/1991 | Westerman et al. | |
| 5,033,014 A | 7/1991 | Carver et al. | |
| 5,034,254 A | 7/1991 | Cologna et al. | |
| 5,052,906 A | 10/1991 | Seemann | |
| 5,071,338 A | 12/1991 | Dublinski et al. | |
| 5,087,193 A | 2/1992 | Herbert, Jr. | |
| 5,116,216 A | 5/1992 | Cochran et al. | |
| 5,123,985 A | 6/1992 | Evans et al. | |
| 5,129,813 A | 7/1992 | Shepherd | |
| 5,167,742 A | 12/1992 | Peters | |
| 5,180,046 A | 1/1993 | Hutton et al. | |
| 5,190,611 A | 3/1993 | Cologna et al. | |
| 5,207,541 A | 5/1993 | Westerman et al. | |
| 5,217,669 A | 6/1993 | Dublinski et al. | |
| 5,290,386 A | 3/1994 | Trudeau | |
| 5,316,462 A | 5/1994 | Seemann | |
| 5,359,887 A | 11/1994 | Schwab et al. | |
| 5,364,584 A | 11/1994 | Imanara et al. | |
| 5,427,518 A | 6/1995 | Morizot et al. | |
| 5,427,725 A | 6/1995 | White et al. | |
| 5,429,326 A | 7/1995 | Garesche et al. | |
| 5,439,635 A | 8/1995 | Seemann | |
| 5,441,692 A | 8/1995 | Taricco | |
| 5,514,232 A | 5/1996 | Burns | |
| 5,576,030 A | 11/1996 | Hooper | |
| 5,601,852 A | 2/1997 | Seemann | |
| 5,612,492 A | 3/1997 | Schwab et al. | |
| 5,667,881 A | 9/1997 | Rasmussen et al. | |
| 5,683,646 A * | 11/1997 | Reiling, Jr. | 264/512 |
| 5,702,663 A | 12/1997 | Seemann | |
| 5,721,034 A | 2/1998 | Seemann, III et al. | |
| 5,759,325 A | 6/1998 | Davis | |
| 5,780,721 A | 7/1998 | Levens | |
| 5,820,894 A | 10/1998 | Kreutzer | |
| 5,879,489 A | 3/1999 | Burns et al. | |
| 5,882,756 A | 3/1999 | Alston et al. | |
| 5,904,972 A | 5/1999 | Tunis, III et al. | |
| 5,932,256 A | 8/1999 | Mandish | |
| 5,939,013 A | 8/1999 | Han et al. | |
| 5,954,898 A | 9/1999 | McKague et al. | |
| 5,958,325 A | 9/1999 | Seemann, III et al. | |
| 6,090,335 A | 7/2000 | McClure et al. | |
| 6,096,164 A * | 8/2000 | Benson et al. | 156/425 |
| 6,206,067 B1 | 3/2001 | Kociemba et al. | |
| 6,211,497 B1 | 4/2001 | Matsen et al. | |
| 6,284,089 B1 | 9/2001 | Anderson et al. | |
| 6,298,896 B1 | 10/2001 | Sherrill et al. | |
| 6,299,819 B1 | 10/2001 | Han | |
| 6,391,246 B2 | 5/2002 | Shiraishi et al. | |
| 6,391,436 B1 | 5/2002 | Xu et al. | |
| 6,406,659 B1 | 6/2002 | Lang et al. | |
| 6,408,517 B1 | 6/2002 | Lehmker et al. | |
| 6,461,551 B1 | 10/2002 | Mandish | |
| 6,510,977 B1 | 1/2003 | Hertz | |
| 6,533,985 B1 | 3/2003 | Smith | |
| 6,551,091 B1 | 4/2003 | Bryant et al. | |
| 6,575,218 B1 | 6/2003 | Burns et al. | |
| 6,579,418 B2 | 6/2003 | Lindsay et al. | |
| 6,589,472 B1 | 7/2003 | Benson et al. | |
| 6,638,466 B1 | 10/2003 | Abbott | |
| 6,689,438 B2 | 2/2004 | Kennedy et al. | |
| 6,692,681 B1 | 2/2004 | Lunde | |
| 6,696,690 B2 | 2/2004 | Benne | |
| 6,761,783 B2 * | 7/2004 | Keller et al. | 156/94 |
| 6,797,390 B2 | 9/2004 | Asai et al. | |
| 6,808,143 B2 | 10/2004 | Munk et al. | |
| 6,830,079 B1 | 12/2004 | Ahrens et al. | |
| 6,860,957 B2 | 3/2005 | Sana et al. | |
| 6,919,039 B2 | 7/2005 | Lang et al. | |
| 7,029,267 B2 | 4/2006 | Caron | |
| 7,127,950 B2 | 10/2006 | Fonov et al. | |
| 7,137,182 B2 | 11/2006 | Nelson | |
| 7,141,191 B2 | 11/2006 | Engwall et al. | |
| 7,186,367 B2 | 3/2007 | Hou et al. | |
| 7,228,611 B2 | 6/2007 | Anderson et al. | |
| 7,294,220 B2 | 11/2007 | Anderson | |
| 7,306,450 B2 | 12/2007 | Hanson | |
| 7,398,586 B2 | 7/2008 | Prichard et al. | |
| 7,398,698 B2 | 7/2008 | Griess et al. | |
| 7,413,694 B2 | 8/2008 | Waldrop, III et al. | |
| 7,503,368 B2 | 3/2009 | Chapman et al. | |
| 7,527,759 B2 | 5/2009 | Lee et al. | |
| 7,534,615 B2 | 5/2009 | Havens | |
| 7,622,066 B2 | 11/2009 | Brustad et al. | |
| 7,624,488 B2 | 12/2009 | Lum et al. | |
| 7,628,879 B2 | 12/2009 | Ackerman | |
| 7,655,168 B2 | 2/2010 | Jones et al. | |
| 7,762,122 B2 | 7/2010 | Advani et al. | |
| 7,849,729 B2 | 12/2010 | Miller et al. | |
| 7,871,040 B2 | 1/2011 | Lee et al. | |
| 7,963,038 B2 | 6/2011 | Schmitz | |
| 7,964,049 B2 | 6/2011 | Kapur et al. | |
| 8,003,034 B2 | 8/2011 | Oldani et al. | |
| 8,114,673 B2 | 2/2012 | Mills et al. | |
| 2002/0060018 A1 | 5/2002 | Lindsay et al. | |
| 2003/0082321 A1 | 5/2003 | Kennedy et al. | |
| 2003/0175511 A1 | 9/2003 | Asai et al. | |
| 2004/0026025 A1 | 2/2004 | Sana et al. | |
| 2004/0031567 A1 | 2/2004 | Engelbart et al. | |
| 2004/0258562 A1 | 12/2004 | Mills et al. | |
| 2005/0086916 A1 | 4/2005 | Caron | |
| 2005/0102814 A1 | 5/2005 | Anderson et al. | |
| 2005/0112772 A1 | 5/2005 | Farone et al. | |
| 2005/0161154 A1 * | 7/2005 | Anderson | 156/278 |
| 2005/0230055 A1 | 10/2005 | Sana et al. | |
| 2005/0236735 A1 | 10/2005 | Oldani et al. | |
| 2005/0253309 A1 | 11/2005 | Hou et al. | |
| 2006/0108058 A1 | 5/2006 | Chapman et al. | |
| 2006/0118235 A1 | 6/2006 | Lum et al. | |
| 2006/0121613 A1 | 6/2006 | Havens | |
| 2007/0029527 A1 | 2/2007 | Mills et al. | |
| 2007/0107189 A1 | 5/2007 | Prichard et al. | |
| 2007/0272582 A1 | 11/2007 | Lau | |
| 2007/0289246 A1 | 12/2007 | Schmitz | |
| 2008/0023015 A1 | 1/2008 | Arnold et al. | |
| 2008/0111024 A1 | 5/2008 | Lee et al. | |
| 2008/0148817 A1 | 6/2008 | Miller et al. | |
| 2008/0308674 A1 | 12/2008 | Frantz et al. | |
| 2009/0145545 A1 | 6/2009 | Brennan et al. | |
| 2009/0148647 A1 | 6/2009 | Jones et al. | |
| 2009/0273107 A1 | 11/2009 | Advani et al. | |
| 2009/0320292 A1 | 12/2009 | Brennan et al. | |
| 2010/0011580 A1 | 1/2010 | Brennan et al. | |
| 2010/0078126 A1 | 4/2010 | Brennan et al. | |
| 2010/0170326 A1 | 7/2010 | Miller et al. | |
| 2011/0079174 A1 | 4/2011 | Miller et al. | |
| 2011/0259086 A1 | 10/2011 | Harris et al. | |
| 2011/0259515 A1 | 10/2011 | Rotter et al. | |

FOREIGN PATENT DOCUMENTS

| | | | |
|---|---|---|---|
| EP | 0271263 | A2 | 6/1988 |
| EP | 0319449 | A2 | 6/1989 |
| EP | 0348831 | A2 | 1/1990 |

(56) References Cited

FOREIGN PATENT DOCUMENTS

| | | |
|---|---|---|
| EP | 0391641 B1 | 10/1990 |
| EP | 0629497 A2 | 12/1994 |
| EP | 0816438 A2 | 1/1998 |
| EP | 1038656 A1 | 9/2000 |
| EP | 1780120 A2 * | 5/2007 |
| EP | 1995044 A2 | 11/2008 |
| EP | 1995045 A2 | 11/2008 |
| EP | 2067611 A1 | 6/2009 |
| EP | 0391641 A3 | 7/2010 |
| EP | 2383106 A1 | 2/2011 |
| EP | 2383559 A1 | 4/2011 |
| EP | 2444240 A1 | 4/2012 |
| GB | 2478848 A | 9/2011 |
| JP | 60252235 A | 12/1985 |
| JP | 62259059 A | 11/1987 |
| JP | 2004309379 A | 11/2004 |
| KR | 1997-0058260 | 11/1997 |
| WO | 9322127 A1 | 11/1993 |
| WO | 0176892 A1 | 10/2001 |
| WO | 02099416 A1 | 12/2002 |
| WO | 03021252 A1 | 3/2003 |
| WO | 2004031321 A1 | 4/2004 |
| WO | 2005056391 A2 | 6/2005 |
| WO | 2005059500 A1 | 6/2005 |
| WO | 2006110627 A1 | 10/2006 |
| WO | 2006118692 A1 | 11/2006 |
| WO | 2008054499 A2 | 5/2008 |
| WO | 2008088435 A1 | 7/2008 |
| WO | 2010025376 A1 | 3/2010 |

OTHER PUBLICATIONS

Korea Patent Office action dated Jun. 21, 2010 for application 2008-47566.

USPTO office action dated Jun. 23, 2011 for U.S. Appl. No. 11/751,928.

USPTO office action for U.S. Appl. No. 11/751,928 dated Apr. 13, 2011.

Notice of Allowance, dated Sep. 21, 2012, regarding U.S. Appl. No. 12/725,380, 19 pages.

Notice of Allowance, dated Sep. 14, 2012, regarding U.S. Appl. No. 12/906,489, 34 pages.

Office Action, dated Oct. 24, 2012, regarding U.S. Appl. No. 11/952,222, 39 pages.

Final Office Action, dated Nov. 16, 2012, regarding U.S. Appl. No. 12/764,202, 31 pages.

Brennan et al., "Compacting Prepreg Plies on Composite Laminate Structures," U.S. Appl. No. 13/657,137 and Preliminary Amendment, filed Oct. 22, 2012, 37 pages.

USPTO Office Action dated Jan. 19, 2012 for U.S. Appl. No. 11/751,928, pp. 13.

USPTO Office Action dated Oct. 26, 2010 for U.S. Appl. No. 11/952,222, pp. 21.

USPTO Office Action dated Oct. 3, 2011 for U.S. Appl. No. 11/952,222, pp. 23.

USPTO Final Office Action dated Apr. 15, 2011 for U.S. Appl. No. 11/952,222, pp. 20.

USPTO Office Action dated May 17, 2010 for U.S. Appl. No. 12/200,882, pp. 11.

USPTO Final to Office Action dated Oct. 26, 2010 for U.S. Appl. No. 12/200,882, pp. 8.

European Search Report dated Mar. 2, 2009 regarding EP08171011, 9 Pages.

European search report dated Mar. 14, 2012 regarding EP12151305, 6 Pages.

USPTO office action dated Jan. 19, 2012 regarding U.S. Appl. No. 11/751,928, 13 Pages.

USPTO office action dated Oct. 26, 2010 regarding U.S. Appl. No. 11/952,222, 21 Pages.

USPTO office action dated Oct. 3, 2011 regarding application 11/952,22, 23 Pages.

USPTO final office action dated Apr. 15, 2011 regarding U.S. Appl. No. 11/952,222, 20 Pages.

Response to office action dated Aug. 9, 2010 regarding U.S. Appl. No. 11/952,222, 8 Pages.

Response to office action dated Jan. 21, 2011 regarding U.S. Appl. No. 11/952,222, 25 Pages.

Response to office action dated Sep. 8, 2011 regarding U.S. Appl. No. 11/952,222, 29 Pages.

USPTO non-final office action dated May 17, 2010 regarding U.S. Appl. No. 12/200,882, 11 Pages.

USPTO final office action dated Oct. 26, 2010 regarding U.S. Appl. No. 12/200,882, 8 Pages.

Response to office action dated Aug. 11, 2010 regarding U.S. Appl. No. 12/200,882, 20 Pages.

Response to office action dated Jan. 24, 2011 regarding U.S. Appl. No. 12/200,882, 17 Pages.

Buckingham et al., "Automating the manufacture of composite broadgoods", Composites Part A, vol. 27A, No. 3, Copyright 1996, pp. 191-200.

PCT Search Report dated Feb. 1, 2010 regarding 07-0638A PCT, application No. PCT/US2009/055378, applicant The Boeing Company, 5 pages.

Campbell (Ed.), "Ply Collation: A Major Cost Driver, In: Manufacturing Processes for Advanced Composites," Elsevier Advanced Technology, Oxford, UK, pp. 131-173, 2004.

Jayaweera et al., "Adaptive robotic assembly of compliant aerostructure components," Robotics and Computer-Integrated Manufacturing, vol. 23, No. 2, pp. 180-194, Jan. 2007.

Sieberg et al., "Eine fortschrittliche GFK—Fertigungstechnik setze sich durch: Praxiserfahrungen mit dem Vakuum-Injektions-Verfahren," Studiedag Vakuuminjecteren, XP002169062, Oct. 27, 1998, pp. 13-19. (German-language article not available in English).

International Search Report dated May 29, 2008 regarding Application No. PCT/US2007/023455 (WO2008088435), 3 pages.

International Search Report dated Jul. 15, 2011 regarding Application No. GB1104472.4 (GB2478848), 5 pages.

International Search Report dated Sep. 15, 2011 regarding Application No. EP11160866 (EP2383106), 4 pages.

USPTO Office Action dated Mar. 10, 2010 regarding Application No. 11/829,900, 10 pages.

USPTO Notice of Allowance dated Jul. 30, 2010 regarding U.S. Appl. No. 11/829,900, 8 pages.

USPTO Office Action dated Feb. 21, 2012 regarding U.S. Appl. No. 12/906,489, 15 pages.

USPTO Final Office Action dated Apr. 30, 2012 regarding U.S. Appl. No. 11/952,222, 25 pages.

USPTO Office Action dated Jul. 27, 2010 regarding U.S. Appl. No. 12/242,477, 13 pages.

USPTO Final Office Action dated Dec. 2, 2010 regarding U.S. Appl. No. 12/242,477, 15 pages.

USPTO Office Action dated Nov. 14, 2011 regarding U.S. Appl. No. 12/768,007, 20 pages.

Lee et al., "Novel UV-Activated Colorimetric Oxygen Indicator," Chemistry of Materials, vol. 17, No. 10, May 2005, pp. 2744-2751.

Office Action, dated Mar. 21, 2013, regarding U.S. Appl. No. 12/200,882, 47 pages.

El Amin, "Nano ink indicates safety breach in food packaging," http://www.foodproductiondaily.com/Quality-Safety/Nano-ink-indicates-safety-breach-in-food-packaging, Nov. 14, 2006, 2 pages.

European Search Report, dated Sep. 30, 2011, regarding Application No. EP11160843 (EP2383559), 7 pages.

Lee et al., "Novel UV-Activated Colorimetric Oxygen Indicator," Chemistry of Materials, vol. 17, No. 10, May 2005, pp. 2744-2751. (Abstract).

Mills et al., "UV-Activated Luminescence/Colourimetric O2 Indicator," International Journal of Photoenergy, vol. 2008, 2008, 6 pages.

Setnescu et al., "Polymer Films Doped with Colorants as Oxygen Sensitive Materials," Journal of Optoelectrics and Advanced Materials, vol. 8, No. 2, Apr. 2006, pp. 682-686.

USPTO Final Office Action, dated Jun. 20, 2012, regarding U.S. Appl. No. 11/751,928, 20 pages.

USPTO Notice of Allowance, dated Jun. 13, 2012, regarding U.S. Appl. No. 12/906,489, 9 pages.

(56) References Cited

OTHER PUBLICATIONS

USPTO Office Action, dated Apr. 26, 2012, regarding U.S. Appl. No. 12/764,202, 13 pages.
USPTO Final Office Action, dated May 3, 2012, regarding U.S. Appl. No. 12/768,007, 29 pages.
USPTO Notice of Allowance, dated Jul. 5, 2012, regarding U.S. Appl. No. 12/242,477, 9 pages.
Miller et al., "Leak Detection in Vacuum Bags," USPTO U.S. Appl. No. 13/892,916, filed May 13, 2013, 48 pages.
Office Action, dated May 9, 2013, regarding USPTO U.S. Appl. No. 11/952,222, 27 pages.
Office Action, dated Mar. 26, 2013, regarding USPTO U.S. Appl. No. 13/657,137, 41 pages.
Office Action, dated Apr. 1, 2013, regarding USPTO U.S. Appl. No. 12/764,202, 38 pages.

* cited by examiner

PRE-PATTERNED LAYUP KIT AND METHOD OF MANUFACTURE

CROSS-REFERENCE TO RELATED APPLICATIONS

This application is related to co-pending U.S. patent application Ser. No. 11/751,928, filed on May 22, 2007, which is incorporated by reference herein in its entirety, and which is assigned to the same assignee hereof.

STATEMENT REGARDING FEDERALLY SPONSORED RESEARCH OR DEVELOPMENT (Not Applicable)

TECHNICAL FIELD

The present disclosure relates generally to aircraft production and more particularly, to a composite material layup kit used in airframe fabrication.

BACKGROUND

Modern commercial aircraft may be fabricated using substantial amounts of composite materials, which require manufacturing apparatus and techniques different from those used with metal component production. Composite materials may be machine-placed or hand-applied. Automated fiber placement (AFP) machines were developed for the fabrication of large aircraft, with a typical AFP machine using a mandrel to place composite materials, usually as bundled composite fiber yarns, or tows, on the airframe. A typical AFP system uses an application head to align a plurality of independent composite tapes into contiguous edge contact, forming a single band, which subsequently is subjected to controlled placement onto the tool, or mandrel surface. AFP mandrels can be massive, often weighing from 20 tons to over 100 tons. AFP machines are most efficient when used in continuous rotation around the fuselage barrel; however, a typical airframe has numerous features for which continuous application techniques may be inefficient. Also, features such as cut-outs and openings for ports, hatches, doors, etc. may need one or more additional reinforcement layers of composite materials. Frequently, these layers are placed with an orientation or direction angle different from the primary orientation of continuous fiber placement. Currently, reinforcement materials may be supplied as unfinished composite panels, for example, an unfinished monolayer or multilayer prepreg fabric panel, or as a multilayer kit formed to approximately cover a region of airframe. During application, each panel may need to be cut, trimmed, bonded, and finished to accommodate underlying cut-outs and openings for ports, hatches, or doors.

During machine-placement of each reinforcement layer, a typical AFP mandrel may need to be stopped, repositioned, and restarted. For some applications, the steps of hand-application, trimming, bonding, and finishing, may be repeated numerous times. Manually-applied panels may be susceptible to errors inherent to piecemeal placement by human operators, including errors in positioning or application. With either method, an inspection may be performed after each layer is applied to ensure correct structural positioning, lamination and bonding integrity, and absence of undesirable characteristics, to within acceptable tolerances. A mis-positioned or misapplied panel may be removed from the fuselage and reapplied, or a new panel applied. Before reapplication, however, the underlying surface may need to be prepared again for panel application, thereby risking disturbance of, or damage to, that surface. In addition, the panel itself may be damaged during removal or reapplication.

Clearly, current processes used to apply composite materials, in such form, can be tedious, time-consuming, labor-intensive, and wasteful of materiel, increasing manufacturing costs and production time. Such inefficiencies can be unacceptable in the commercial production of large transport-class aircraft. As a result, there is a need for a layup kit and a method to manufacture such a kit that can be applied to an airframe efficiently, while minimizing both discontinuous AFP mandrel operation and manual layup application.

SUMMARY

In one embodiment, a method for manufacturing a layup kit for an airframe is provided. The method includes fabricating a pre-patterned layup having a preselected pattern shaped to accommodate an airframe topological feature.

In another embodiment, a layup kit is provided. The layup kit includes a pre-patterned layup having a preselected pattern shaped to accommodate an airframe topological feature.

In yet another embodiment, the layup includes a pre-patterned layup including multiple prepreg laminae, wherein at least one of the multiple prepreg laminae is fabricated to have a preselected pattern shaped to accommodate an airframe topological feature, pre-trimmed to fit a preselected target region of an airframe layup structure; and conformed to an airframe contour corresponding to the preselected target region; a flexible carrier having an obverse surface and an indexing element, wherein the pre-patterned layup is releasably laid down on the obverse surface of the flexible carrier, and wherein selected ones of the multiple laminae are laid down on the flexible carrier in respective lamina orientations relative to the indexing element; and a layup release layer interposed between the pre patterned layup and the obverse surface of the flexible carrier, wherein the layup kit is a pre-patterned layup kit.

This brief summary has been provided so that the nature of the various embodiments may be understood quickly. A more complete understanding of the embodiments can be obtained by reference to the following detailed description of the preferred embodiments thereof in connection with the attached drawings.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1I:
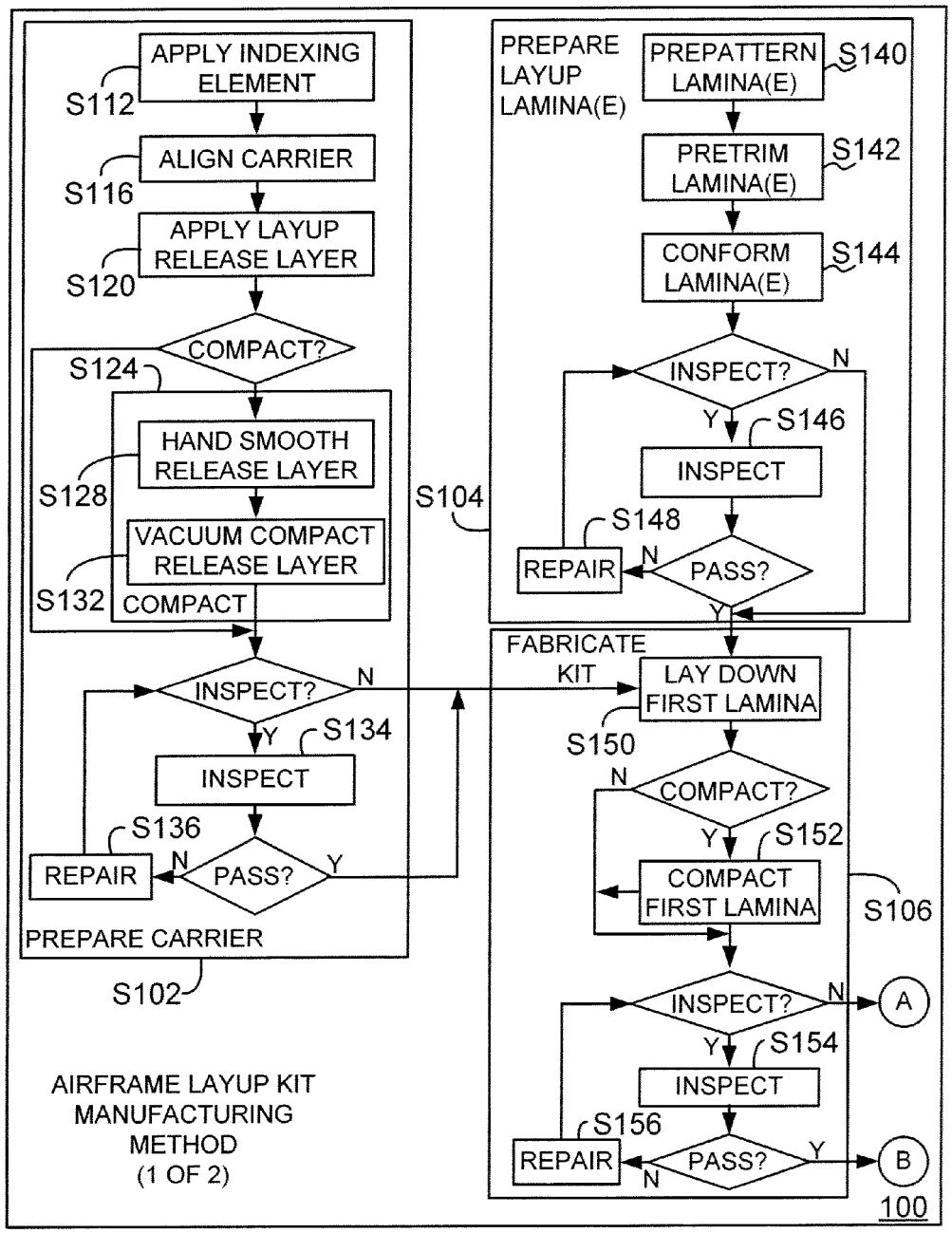
FIG. 1 illustrates a process flow of a method for manufacture of a pre-patterned layup kit, in accordance with the present disclosure.

The present disclosure describes embodiments of a pre-patterned layup kit and corresponding manufacturing methods, capable both of being applied by an automated layup method, and of accommodating a wide range of layup structure contours, geometries, sizes, and configurations.

As used herein, a "layup" refers to a shaped assembly, including composite materials, having one layer (lamina) or multiple layers. A multiple-layer layup may be fabricated in a stack configuration, in a sandwich configuration, or in a combination thereof. A composite material may be a fiber matrix material having fibers arranged and surrounded by a support matrix. In general, a fiber can refer to any suitable filamentary material, either natural or manmade, including, without limitation, carbon filamentary material, graphite filamentary material, polymer filamentary material, metal filamentary material, or a combination thereof. In addition, a metal filamentary material may include, without limitation, aluminum, stainless steel, titanium, or alloys, or organometallic combinations thereof. Fibers may be arranged in a fiber system as whiskers, collimated filaments, fiber yarns, woven fabric, ribbons, mats, or combinations thereof. One example of a composite material can be a reinforced composite material that is a combination of two or more constituent materials, which differ in physical properties, chemical properties, or both, which generally retain their respective properties in composition, and which may act synergistically to impart special properties to the resultant composite material. The terms "composite," and "reinforced composite" can be synonymous. In modern airframe manufacturing, the constituent materials generally include reinforcement material in the form of a fiber system, which is surrounded and maintained within a support matrix system.

A fiber system reinforcement material may include, without limitation, glass fibers, carbon fibers, graphite fibers, metal fibers, or a combination thereof, which may be provided in numerous forms including, without limitation, a woven fabric, a non-woven fabric, a mat, a cloth, a scrim, a tape, a strand, a tow, or a combination thereof. In general, a tow is an untwisted bundle or yarn of generally parallel continuous filaments, including continuous carbon fiber filaments, which may be used alone or as a constituent of a fabric, a cloth, a tape, or combinations thereof. Typically, this yarn, and other material forms made from such yarn, can be identified by the number of filaments provided in each tow. For example, a carbon tow designated "6K" typically constitutes 6000 continuous carbon filaments. Similarly, a carbon fabric may be fabricated from 6K carbon tows in one or both of the warp and the fill. Although a layup may be described in terms of a carbon or a graphite material, present embodiments also encompass a layup in which one or more lamina may be constituted of a metal or metal composite material.

Also, a support matrix system can be a material suitably constituted for embedding a selected fiber system, including an organic matrix material, a metallic matrix material, an intermetallic matrix material, or an organometallic matrix material. In one non-limiting example of a support matrix, a carbon fiber system may be embedded in a thermoset or thermoplastic material, such as toughened epoxy resin organic matrix material. A metallic matrix material can be constituted of one or more metals including, without limitation, aluminum, stainless steel, titanium, alloys, or intermetallic compounds, thereof. A non-limiting example of a support matrix system can be a resin matrix system, A resin matrix system can be an organic polymer or prepolymer, which may have thermoset or thermoplastic properties, and which may contain a wide variety of components or additives to influence handling and processing behavior and physical properties. A resin matrix system also may be constituted for use as an adhesive, capable of producing surface attachment between, for example, adjacent composite material layers or a composite material layer and an airframe surface. An example of a commonly-used resin matrix system can be a polymerizable thermosetting resin, such as an epoxy polymeric resin. Typically, resin matrix systems may be identified in terms of a nominal resin cure temperature, the resin type, and special material characteristics.

However, the embodiments herein are not limited to layups fabricated with a resin matrix system, and other suitable matrix systems may be employed. In addition, one or more layup lamina may be a layer of metal, or metal alloy, including, without limitation, aluminum or an aluminum alloy, stainless steel or a stainless steel alloy, titanium or a titanium alloy, magnesium or a magnesium alloy, or silicon carbide or a silicon carbide alloy. Also, one or more lamina may be fabricated from an intermetallic-matrix composite material, a metal-matrix composite material, or a ceramic composite material. Such matrix systems, and functional analogues, are well-known in the art.

A pre-patterned layup kit may be placed in a definable spatial relationship with a layup structure, relative to a known fiducial location, or "home," within a spatial reference system corresponding to the layup structure. A fiducial location generally describes a known reference location that may be used by a human operator or a machine to identify boundary conditions within a common spatial reference system and to identify selected locations in the spatial reference system with uniformly high precision. A workspace is a definable spatial reference system including a fiducial location. By way of definition, to "correspond to" a known location is to be in a defined spatial relationship with that location. Also, registration is the process of establishing correspondences between a known fiducial location and a particular plane or set of planes within the workspace. Such a plane may define a local frame of reference. A registration position is an identified location for which such a local frame of reference has been established. Indexing is the process of establishing a point, or region, of operation within a local frame of reference; an indexed position is a point or region of operation so identified. A registration position may correspond to one or more indexed position(s) within a corresponding local frame of reference. As used herein, an indexed position, and the location of objects at the indexed position, may be made to correspond to a known fiducial location by making the registration position correspond to the known fiducial location. An indexed position may correspond to a unique location on the surface of a structure spatially referenced to the known fiducial location in the workspace.

As used herein, a layup structure is a structure to which a layup may be applied. An example of a layup structure can be an airframe or a portion thereof including, without limitation, a fuselage, a wing, a canard, a cone, a door, a radome, a fin, a nose, an empennage, a nacelle, a strake, a spar, or a fairing. Another example of a layup structure can be a forming tool including, without limitation, a mold or a mandrel. A mold forming tool may be employed in the fabrication of an angular airframe portion such as, without limitation, a wing, a canard, a strake, a door, a radome, a spar, a fairing, or a portion thereof. Similarly, a mandrel forming tool may be employed in the fabrication of a cylindrical airframe portion including, without limitation a nose, a cone, a fuselage, a door, a radome, an empennage, a nacelle, or a portion thereof. Of course, other forming tools may be employed, and other layup structures may be selected. For convenience, certain embodiments herein may be described with respect to an airframe fuselage, although this is not to be taken as a limitation.

A layup structure may have a definable cross-sectional shape at each preselected registration position along the reference axis. An application width may describe a linear extent of a definable region of a layup structure surface at a preselected registration point along the reference axis. The linear extent of an application width is oriented generally perpendicularly to the application direction and generally along the reference axis. An untapered portion of a layup structure may exhibit a predetermined contour profile that remains substantially unchanged over the application width corresponding to a preselected registration point. However, the layup structure may be tapered along the reference axis, that is, have a varying cross-sectional shape, for example, along the layup structure reference axis. Thus, a tapered portion of a layup structure may exhibit a predetermined contour profile varying in three-dimensions over the extent of an application width. Accordingly, a preselected layup material may be configured to conform to a predetermined contour profile, which may vary in three dimensions along an application width corresponding to a preselected registration point.

In addition, the term "application" is made with reference to placing a preselected material on the surface of a structure spatially referenced in the workspace. The preselected material may be treated to adhere to the structure surface after it is placed. The structure can have a predetermined contour profile, that is, a definable cross-sectional shape, which may vary in three-dimensions over the structure length. An application path can describe a definable region of the structure surface over which the material may be applied; an application direction can describe an orientation of an application path within the workspace, from a start point to an end point; and an application rate can describe time-referenced motion along the application path. Similarly, an application force can be a selectable force impressed upon material being placed along the application path. The application force can be impressed along the application path in the application direction; however, the application force has a direction and an orientation that generally are different from the application direction. For example, the application force direction may be normal to the application direction over at least part of the application path. In general, an application path can be referenced to a selectable registration position, and may be rectilinear or curvilinear.

"Inconsistencies," as the term is used in the appropriate context throughout this disclosure, refers to the difference between one or more measured characteristics of a composite structure that has been unaffected by exposure to external factors (including thermal loads, foreign object debris (FOD), structural loads, lightning, or electrical arcing) with the same one or more measured characteristics of a composite structure that has been affected by exposure to the external factors. "Inconsistencies," also includes the difference between one or more measured characteristics of a composite structure manufactured within design tolerances with the same one or more measured characteristics of a composite structure manufactured beyond design tolerances.

Figure 1:
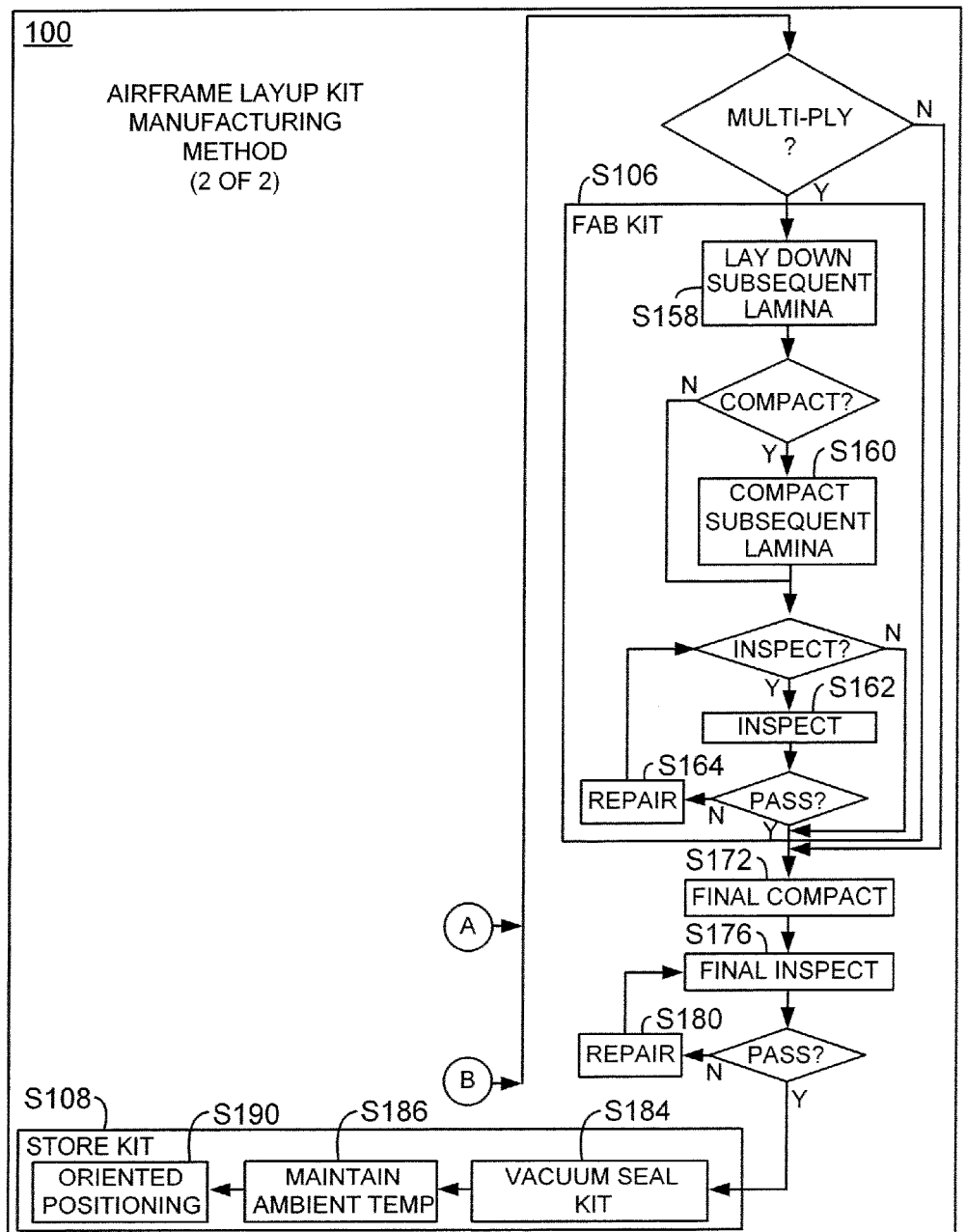

FIG. 1 illustrates embodiments of a layup kit manufacturing method 100, including preparing a layup carrier (S102) preparing a pre-patterned layup (S104), preparing a pre-patterned layup kit (S106), and, in addition, storing the pre-patterned layup kit (S108). In general, a layup kit includes a pre-patterned layup, and a flexible carrier on which the pre-patterned layup may be releasably laid.

Preparing (S102) a flexible carrier for kitting may proceed by applying (S112) an indexing element, and by aligning (S116) the flexible carrier to a reference orientation. An indexing element may be used to orient the flexible carrier in a reference orientation. The indexing element also may be used to establish a spatial reference system corresponding to the flexible carrier 250 (See FIG. 2), in which a point on the flexible carrier 250 may be established unambiguously. It is desirable to release the layup from the flexible carrier 250, after being applied to the airframe, so preparing (S102) the flexible carrier 250 can include applying (S120) a layup release layer to an obverse surface of the flexible carrier 250. Because wrinkles or creases in the layup release layer can be undesirable, compacting (S124) the layup release layer, for example, by one or both of hand smoothing (S128) the layup release layer and/or vacuum compacting on the flexible carrier. The layup release layer may be rendered substantially smooth and flat on the flexible carrier surface by using a compacting (S132) technique, including vacuum-compacting the kit for at least about 5 minutes. Methods and apparatus used to effect vacuum compacting include those well-known in the art of reinforced composite material manufacture. After compacting, it may be beneficial to inspect (S134) the disposition of the layup release layer on the flexible carrier 250. If inspection is unsatisfactory, the release layer may be reworked or replaced (S136).

In preparing a pre-patterned layup (S104), the constituent lamina or laminae may be prepared in advance of preparing a pre-patterned layup kit (S106), or concurrently therewith. Advanced preparation may be desirable, for example, in a large-scale production environment. A pre-patterned lamina can be fabricated from a suitable material, such as a metal ply, screen, foil, a reinforcing material like a tape or a fabric sheet. An example of a suitable composite material for layup 210 (See FIG. 2) may include without limitation a carbon fiber material, such as plain weave fabric or unidirectional tape formed from 6 k carbon fiber tows that is pre-impregnated with toughened epoxy having a nominal curing temperature of about 350° F.

At least one pre-patterned lamina may be created by trimming a preselected pattern (S140) into a respective piece of composite fabric, which typically is planar in form. Advantageously, the preselected pattern can be shaped to accommodate an airframe topological feature including, without limitation, a door, an access hatch, or a port. Also, the composite material can be pre-trimmed (S142) to fit a preselected target region of a layup structure. In a multilayer layup, one or more additional lamina(e) may be pre-patterned by forming with a preselected pattern, pre-trimming to a preselected target region, or both. Moreover, pre-patterned lamina, or laminae, can be conformed (S144) to an airframe contour corresponding to an airframe topological feature, such that planar pre-patterned lamina(e) may be applied conformingly to a contoured portion of a layup structure, such as a fuselage. A pre-patterned lamina may be amenable to fabrication, at least in part, using modern automated, or semi-automated manufacturing techniques, including without limitation, high-precision cutting, shaping, or sizing using, for example, a CNC-controlled multi-axis laser or high-pressure water jet. Hand-cutting techniques also may be used. After being created, but before being laid down in a kit, it may be desirable to inspect (S146) pre-patterned lamina(e), and reworking or replacing (S148) defective lamina(e).

Preparing a pre-patterned layup kit (S106) may include laying down a pre-patterned layup. A pre-patterned layup and, thus, a pre-patterned layup kit, may be fabricated to include a single pre-patterned lamina or multiple laminae including a pre-patterned lamina. The pre-patterned layup can be fabricated by laying down (S150) a first pre-patterned lamina on the flexible carrier in a first lamina orientation. The first pre-patterned lamina can be indexed to the flexible carrier by being laid down relative to a spatial reference system of the flexible carrier. By extension, the first lamina orientation can be made to correspond to the carrier spatial reference system. Therefore, the first pre-patterned lamina and, by extension, the first lamina orientation, may be indexed to the flexible carrier.

Compacting (S152) the first pre-patterned lamina on the flexible carrier may be beneficial, including vacuum-compacting for at least about 5 minutes. In addition, after being laid down and compacted, inspecting (S154) the disposition of the first pre-patterned lamina, in accordance with a preselected inspection standard, may be desirable. Inspecting (S154) may include, without limitation, at least one of inspecting a ply characteristic, a bonding characteristic, or an interlaminar characteristic. A ply characteristic may include a ply orientation, a ply boundary, a ply lap, or a ply gap. Bonding characteristics and inter-laminar characteristics may include characteristics that are within tolerance and those out of tolerance. If inspection is unsuccessful, reworking or replacing (S156) the first pre-patterned lamina may be desirable.

If fabricating a multi-layered pre-patterned layup kit, method 100 may include iteratively laying down (S158) subsequent lamina(e) on the flexible carrier in a respective subsequent lamina(e) orientation. Multiple subsequent laminae may be arranged, for example, in a stacked configuration. Subsequent lamina(e) can be pre-patterned (e.g., S140) in cooperation with the first pre-patterned lamina to accommodate an airframe topological feature, pre-trimmed (e.g., S142) to fit to a preselected target region, or both, but are not required to be. Moreover, subsequent lamina(e) may be conformed (e.g., S144) to an airframe contour corresponding to an airframe topological feature. Subsequent pre-patterned lamina(e) can be indexed to the flexible carrier by being laid down relative to a spatial reference system of the flexible carrier. By extension, subsequent lamina orientation can be made to correspond to the carrier spatial reference system. Therefore, subsequent pre-patterned lamina(e) and, by extension, a respective subsequent lamina orientation, may be indexed to the flexible carrier. It may be desirable to limit the number of crossply lamina present in a composite layup, to limit the number of laminae laid down intermediate to crossply lamina, or both.

Compacting (S160) may be desirable after a predetermined number of subsequent lamina(e) are laid down. For example, it may be beneficial to perform compacting after each subsequent lamina, after three subsequent laminae are laid down, or after another predetermined number of subsequent laminae are laid down. Compacting (S160) may employ a predetermined compacting technique known in the art. A non-limiting example of compacting (S160) may be vacuum-compacting the kit for at least about 5 minutes. After compacting, inspecting (S162) a subsequent lamina(e) for an inconsistency, a ply characteristic, a bonding characteristic, an interlaminar characteristic, or a combination thereof, may be desirable. If inspection is unsuccessful, reworking or replacing (S164) the subsequent lamina may be desirable.

After the pre-patterned layup kit is formed, including at least one pre-patterned lamina, it is desirable to perform post-fabrication kit compacting (S172) of the formed pre-patterned layup, for example, to remove intralaminar voids and inclusions which may be present. Post-fabrication compacting (S172) may be vacuum-compacting for at least about 5 minutes, as with previous compacting (S140, S160), although other compacting actions may be taken. Method 100 may include post-fabrication kit inspecting, final inspection, (S176) for a layup characteristic, including, an inconsistency, a ply characteristic, a bonding characteristic, an interlaminar characteristic, edge taper, step down of edge taper, or a combination thereof. Also, post-fabrication inspecting, final inspection, (S176) may be made with respect to other inspection criteria, to evaluate the pre-patterned layup kit for a predetermined within tolerance kit characteristic, a predetermined out of tolerance characteristic, or both. If inspection is unsuccessful, reworking or replacing (S180) defective kit elements may be desirable.

Advantageously, a pre-patterned layup kit may be manufactured, in accordance with the present disclosure, in advance of being applied to an airframe. Accordingly, method 100 also may include storing (S108) a pre-patterned layup kit. It can be beneficial to store a pre-patterned layup kit in a storage environment capable of preserving the pre-patterned airframe layup kit between kit fabrication and application. Thus, providing a storage environment may include degassing and sealing (S184) a pre-patterned layup kit, establishing and maintaining (S186) a predetermined ambient kit temperature, and positioning (S190) the kit in a predetermined storage orientation. Degassing and sealing (S184) may be accomplished using, for example, a suitable vacuum-sealing technique in accordance with known sealing techniques in the reinforced composite material arts. In addition, regarding establishing and maintaining a predetermined ambient kit temperature, a pre-patterned layup kit may be stored within a predetermined storage temperature range for a predetermined storage period. The storage temperature range and storage period typically correspond to the type of resin system used to fabricate the layup kit, as may be specified, for example, by a resin system manufacturer. Also, positioning (S190) the kit in a predetermined storage orientation may include suspending the pre-patterned layup kit on-edge, that is, in an orientation generally at a right angle to the obverse surface of the flexible carrier. The predetermined storage orientation may be aligned longitudinally or transversely to the predetermined storage orientation. The flexible carrier may be disposed with a storage positioning receiver, for example, a coupler or a slot, which may be formed to mate with a storage positioning hanger.

Figure 2:
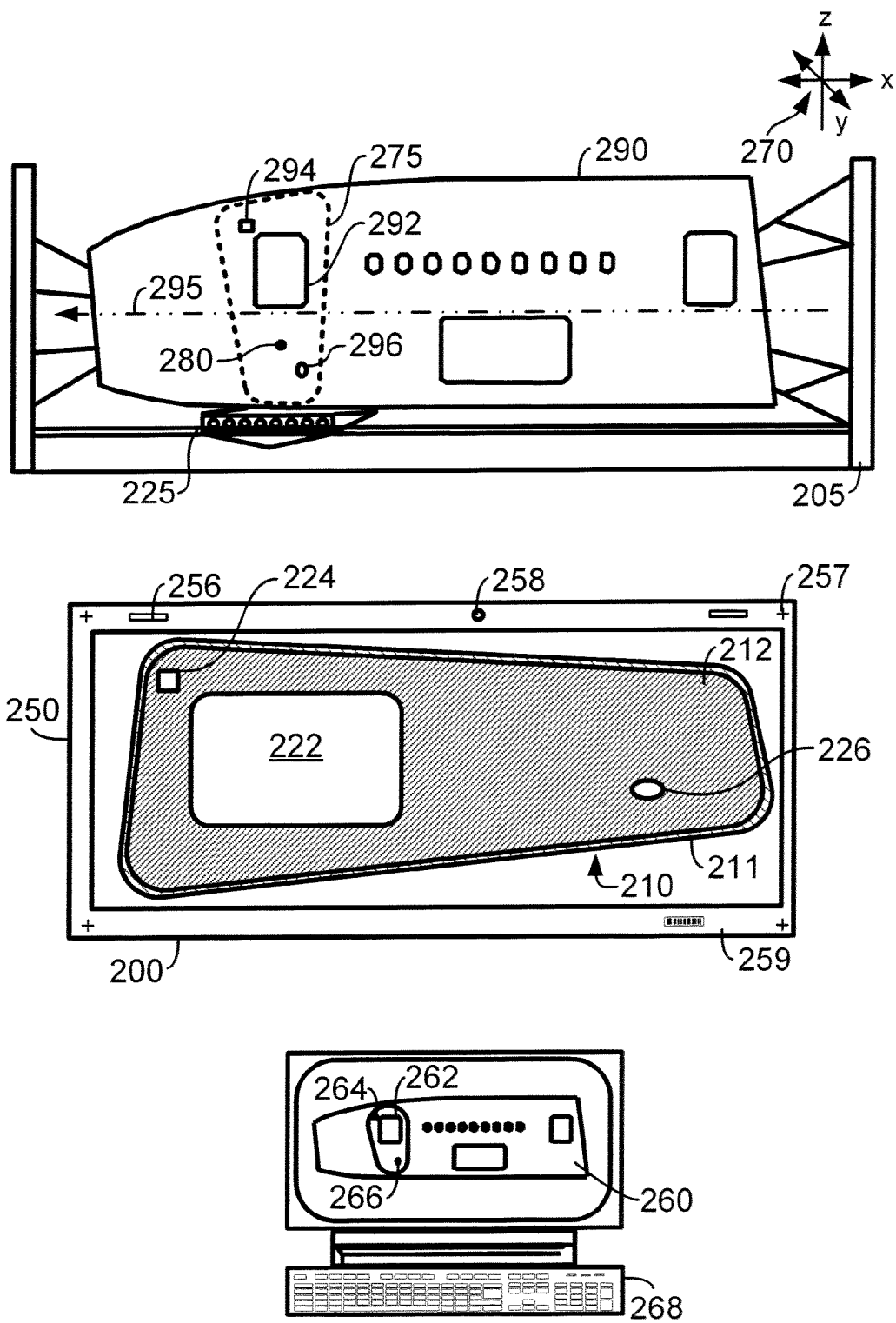
FIG. 2 graphically illustrates a layup structure, an embodiment of a pre-patterned layup kit to be placed on the layup structure, in accordance with the present disclosure.

Turning to FIG. 2, pre-patterned layup kit 200, in accordance with the present disclosure, can include pre-patterned layup 210, and flexible carrier 250. Pre-patterned layup 210 may be fabricated from a suitable reinforced composite material, such as a tape, a screen, a foil, a metal ply or a fabric, and may be built up from one or more laminae of prepreg composite material build up. Of course, other materials may be used to fabricate pre-patterned layup 210. In selected applications, it may be advantageous to employ a carbon fiber system supported in a toughened epoxy resin system. An example of a suitable composite material for layup 210 may include a carbon fiber material, such as plain weave fabric or unidirectional tape formed from 6 k carbon fiber tows that is pre-impregnated with toughened epoxy having a nominal curing temperature of about 350° F. Such an epoxy resin system can be cured, for example, in an autoclave heated to the nominal curing temperature, and pressurized to about 85 psig.

Pre-patterned layup 210 can be releasably laid down on flexible carrier 250, and may be positioned on flexible carrier 250 in a predetermined layup orientation. It may be beneficial to fabricate pre-patterned layup 210 on flexible carrier 250, although pre-patterned layup 210 may be fabricated before being laid down on flexible carrier 250. Conveniently, pre-patterned layup kit 200 may be provided as a preselected pre-patterned layup kit corresponding to a particular region of layup structure 290, such as preselected target region 275.

Layup 210 may be fabricated from first pre-patterned lamina 211 alone, as well as two or more subsequent lamina, positioned in cooperation with first pre-patterned lamina 211, including subsequent lamina 212. Multiple laminae of prepreg material may provide beneficial structural reinforcement proximate to, or surrounding, particular airframe topological feature(s). Subsequent lamina 212 also is illustrated to be a pre-patterned lamina, but may not be pre-patterned if laid down on a portion of layup 210 that does not coincide with an airframe topological feature. Pre-patterned lamina 211, 212 may be fabricated by cutting a preselected pattern into a piece of composite fabric. The preselected pattern may be, without limitation, a pre-shaped cutout configured to accommodate an airframe topological feature on layup structure 290. Preselected topological features 222, 224, and 226, respectively correspond to airframe topological feature 292 (e.g., a layup structure door), airframe topological feature 294 (e.g., a layup structure access hatch), and airframe topological feature 296 (e.g., a layup structure port). The preselected topological feature may be contained within preselected target region 275. Also, lamina 211, 212 can be pre-trimmed to fit preselected target region 275. Moreover, laminae 211, 212 can be conformed to an airframe contour corresponding to one or more of preselected topological feature 222, 224, or 226, as well as to preselected target region 275.

Pre-patterned layup 210 can be configured before application as a planar, generally flat, panel of prepreg composite material that is sized and shaped to conform, when applied, to a contoured airframe surface, such as layup structure 290. It is not required that any or each lamina, 211, 212 of pre-patterned layup 210 be fabricated from a unitary panel of composite material. Advantageously, one or both of lamina 211, or lamina 212, may be a composite structure built up, for example, from portions of one or more fabrics, tapes, or tows, as may be desirable to impart a selected topological feature to a portion of pre-patterned layup 210, or to reinforce a lamina 211, 212, including such a feature.

One technique, by which corresponding preselected topological features 222, 224, 226 can be formed, may include precutting and preshaping laminae 211, 212, in accordance with predetermined feature template 260, for example and without limitation a three-dimensional illustration. Template 260 may represent layup structure topographical features such as target region 275, door opening 292, port 294, and hatch 296, as planar template shapes 262, 264, and 266, respectively. Predetermined feature template 260 allows pieces of composite material to be pre-cut and pre-shaped, for example and without limitation, according to material type, lamina orientation, lamina position, three-dimensional illustration and to have their intended placement and orientation verified before fabrication of layup kit 200 begins. Predetermined feature template 260 may be provided, for example, in conjunction with computer-assisted manufacturing system 268, or as one or more mechanical stencils. Also, predetermined feature template 260 also may be used to assist precise placement of pre-patterned layup 210 onto layup structure 290.

Laminae 211, 212 may be laid down in a predetermined sequence, with a predetermined lamina orientation, or edge overlap or all. The respective predetermined lamina orientation may include, without limitation, a unidirectional lamina orientation, a crossply lamina orientation, or an angleply lamina orientation. The unidirectional lamina orientation may be aligned with a selectable reference orientation, the crossply lamina orientation may be generally perpendicular to the selectable reference orientation, and the angleply lamina orientation may be at an acute angle relative to the selectable reference orientation. First pre-patterned lamina 211 may be laid down in a first lamina orientation, and subsequent lamina 212 may be laid down in a subsequent lamina orientation. One or more of the predetermined layup orientation, the first lamina orientation, and the subsequent lamina orientation may be relative to a selectable reference orientation.

Carrier 250 can be a metal sheet with a smooth surface, having a size and shape similar to pre-patterned composite lay-up 210. Pre-patterned layup 210 can be positioned in a predetermined layup orientation on an obverse side of flexible carrier 250, to facilitate accurate placement of layup 210 on layup structure 290. It may be desirable to pre-form carrier 250, relative to the shape of preselected target region 275, for example, to facilitate efficient application of layup 210 to region 275. An example of a suitable metal sheet for carrier 250 may be a flexible aluminum sheet. Carrier 250 may be used in place of, or in addition to, a caul plate. Also, carrier 250 may be a flexible sheet made of steel, Invar, titanium, a composite material or other suitable material.

An indexing element, such as fiducial element 257, indexing slot 258, or indexing bar code 259, may be provided on carrier 250 to establish a spatial reference system corresponding to the flexible carrier, in which a known point on flexible carrier 250 may be established unambiguously. Thus, an indexing element, such as fiducial element 257, indexing slot 258, or indexing bar code 259 may facilitate fabrication of pre-patterned layup 210 having lamina(e) aligned to the selectable reference orientation, and may facilitate positioning of pre-patterned layup 210 in the predetermined layup orientation on flexible carrier 250. Such positioning may use well-known optical, electrical, or magnetic positioning techniques.

Also, the indexing element, such as one or more of indexing elements 257-259 may define a known correspondence between flexible carrier 250 and another spatial reference system. For example, layup structure 290 can be positioned within a defined spatial reference system 270, having a corresponding, and known fiducial position 205. Preselected indexed position 280 may identify an unambiguous location on preselected target region 275, relative to fiducial location 205. Thus, indexing elements 257-59 may be used to align carrier 250 with reference axis 295 of layup structure 290 and, thus, to align pre-patterned layup kit 200 with airframe spatial reference system 270. Accordingly, pre-patterned layup 210 may be brought proximate to, and may be applied on, an unambiguously defined region of layup structure 290, such as preselected target region 275.

After pre-patterned layup 210 is applied to layup structure 290, it is desirable that layup 210 be released from carrier 250, and release layer 240 may be interposed between layup 210 and carrier 250 to facilitate the release. Release layer 240 may be fabricated of a preselected release material having a predetermined release layer thickness. Examples of preselected release material suitable for use as release layer 240 may include, without limitation, a fiberglass material coated with a functionally-inert, adhesion-resistant coating, such as a fluorinated ethylene propylene (FEP) coating, or a tetrafluoroethylene (TFE) coating. A suitable predetermined release layer thickness may be at least about 7 mil thickness.

In addition, after being fabricated, pre-patterned layup kit 200 may be stored. It may be desirable to maintain pre-patterned layup kit 200 in a predetermined storage orientation. An example predetermined storage orientation may be an orientation generally at a right angle to the obverse surface of the flexible carrier on which layup 210 is laid down, that is, on-edge. Flexible carrier 250 may include storage positioning receiver 256, located to maintain the predetermined storage orientation by suspending pre-patterned layup kit 200 to depend from a transverse edge. Of course, storage positioning receiver 256 may be disposed on a longitudinal edge and may be configured to support orientations other than on-edge. Storage positioning receiver 256 may be, for example and without limitation, a coupler or a slot, formed to mate with a storage positioning hanger (not shown).

An example of pre-patterned layup kit 200 can be without limitation, a skin doubler for a door opening in an aircraft layup structure. Such selected embodiments may be used, for example, in conjunction with methods and apparatus described in a co-pending, co-assigned, and concurrently-filed U.S. patent application entitled "METHOD AND APPARATUS FOR LAYUP PLACEMENT," U.S. patent application Ser. No. 11/751,928 (hereinafter, Related Patent Application). One such apparatus may be saddle module 225 for an automated airframe layup placement apparatus as described generally therein. However, pre-patterned layup 210 may be applied in conjunction with other methods and apparatus, including those well-known in the art of fabricating airframe components using reinforced composite materials including, without limitation, automated fiber placement (AFP) techniques.

As will be readily understood, pre-patterned layup 210 and, similarly, pre-patterned layup kit 200, may be fabricated, inspected, and stored as inventory in advance of application to an airframe, such as layup structure 290. Layup kit manufacturing method 100 exemplifies one method by which pre-patterned layup kit 200 may be fabricated and stored. Also, layup structure 290 may include numerous target regions, including preselected target region 275, having respective topological features, and a pre-patterned layup kit, such as pre-patterned layup kit 200, may be fabricated for each target region. Advantageously, an airframe manufactured using pre-patterned composite layups, such as pre-patterned composite layup 210, can reduce waste of composite material and of application time, which otherwise may be experienced with other composite layup structures and composite layup fabrication techniques.

Embodiments of layup kit 200, pre-patterned layup 210, or carrier 250, may be amenable to fabrication, at least in part, using modern automated, or semi-automated manufacturing techniques, including without limitation, high-precision cutting, shaping, or sizing using, for example, a CNC-controlled multi-axis laser or high-pressure water jet. It also is contemplated that one or more portions of one or more lamina of pre-patterned layup 210 may be placed and laid down robotically, although pre-patterned layup 210 may be fabricated using well-known hand layup techniques, in part or in whole. In this way, it may be possible to apply a complex multilayer composite material panel to layup structure 290, as if a single layup unit. In addition, relative to present layups and layup fabrication techniques, it may be possible to realize a significant increase in layup application rates, in some instances, by two orders of magnitude, while simultaneously reducing composite material waste. Thus, it may be possible to fabricate layup 210, well in advance of the corresponding aircraft fabrication and, indeed, at a layup fabrication facility separate from the airframe fabrication facility. Conveniently, such advance fabrication may allow an aircraft manufacturer to fabricate and store multiple pre-patterned layup kits as inventory in a manner similar to commodity or mass-manufactured parts, and later to draw selected pre-patterned layup kits from that inventory, conveying them to the production floor on a timely basis, in keeping with modern just-in-time manufacturing methods.

Figure 3:
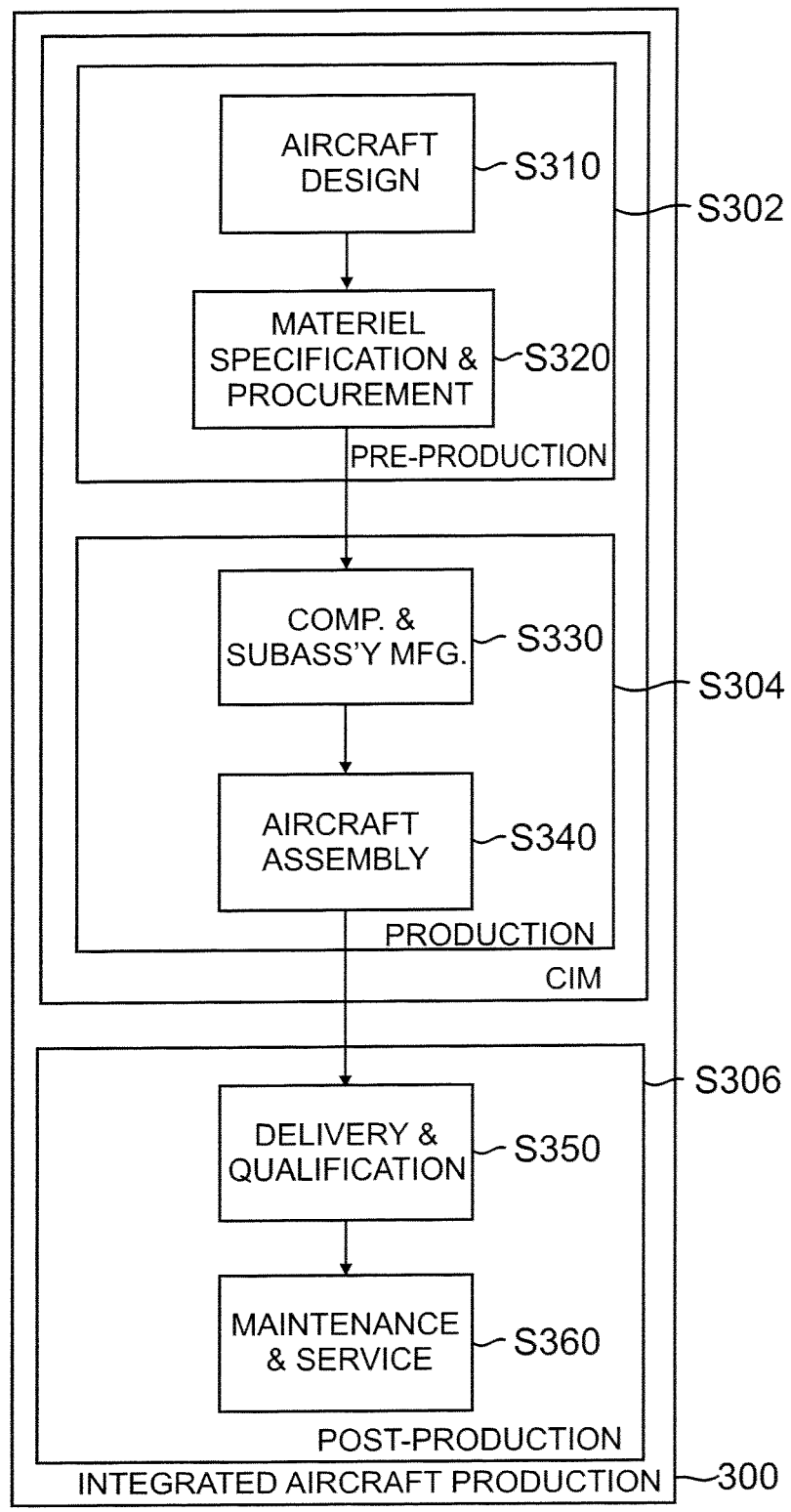
FIG. 3 is a general flow diagram of an integrated aircraft production process, in which a process of FIG. 1 and a layup of FIG. 2 may be implemented.

FIG. 3 illustrates an integrated aircraft production process 300, in accordance with embodiments of layup kit manufacturing method 100 of the present disclosure. As used herein, integrated aircraft production process 300 also may include manufacturing, support, or both. Typically, process 300 includes a pre-production phase (S302), a production phase (S304), and a post-production phase (S306). Pre-production phase S302 may include aircraft design, subassembly, and component design (S310), and materiel specification and procurement (S320). Material specification and procurement (S320) may include selection and procurement of components fabricated, or subassemblies manufactured, by third parties, without limitation, vendors, subcontractors, or suppliers. Production phase S304 may include component fabrication or subassembly manufacturing (S330), and aircraft assembly (S340). Pre-production phase (S302) and production phase (S304) can be elements of an integrated manufacturing process (S300), including one or more of aircraft and component design, development, and simulation processes; material, component, and sub-assembly specification and procurement processes; automated production planning processes; fabrication and assembly processes; and quality control processes.

Frequently, aspects of a modern aircraft production process, such as integrated process 300, do not end with final assembly but may extend over the service life of an aircraft, involving iterative and interactive collaborations between manufacturer, governmental authorities, customers and aircraft operators. Accordingly, integrated production process 300 can include post-production phase (S306). Post-production phase (S306) may include aircraft delivery and qualification (S350), and aircraft service (S360). Aircraft delivery and qualification (S350) may include providing an aircraft to customer specifications, which may have changed after an aircraft was assembled. Thus, delivery and qualification can include rework, modification, or revision of one or more elements of an aircraft after delivery to a customer or operator. Also, it may be desirable to perform a modification, a rework, or an upgrade to an aircraft in the service interval between aircraft delivery and retirement. Therefore, aircraft service S360 can include rework, modification, or upgrade of a portion of an airframe, including an airframe manufactured or assembled using traditional, pre-existing materials, components, or subassemblies.

Apparatus and methods embodied herein may be employed during integrated production process 300 in one or more of phases S302, S304, or S306. For example, components or subassemblies corresponding to production phase S304 may be fabricated or manufactured in a manner similar to components or subassemblies procured during preproduction phase S302, and vice versa. Also, one or more of an apparatus embodiment, a method embodiment, or a combination thereof may be of particular benefit during production phase S304, for example, by substantially expediting assembly of an aircraft. One or more of an apparatus embodiment, a method embodiment or a combination thereof may be of benefit during post production phase S306, for example, without limitation, to rework during delivery and qualification (S350) and/or maintenance and services (S360).

Figure 4:
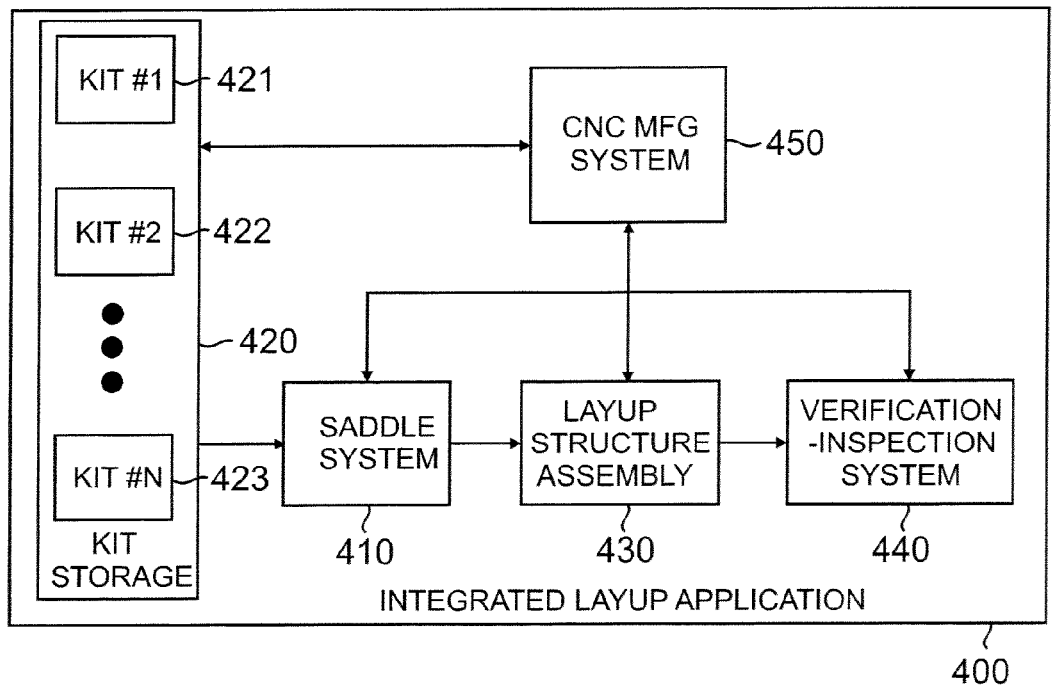
FIG. 4 is a block diagram depicting an embodiment of an integrated layup application system, which may be used in the process depicted in FIG. 3.
Figure 5:
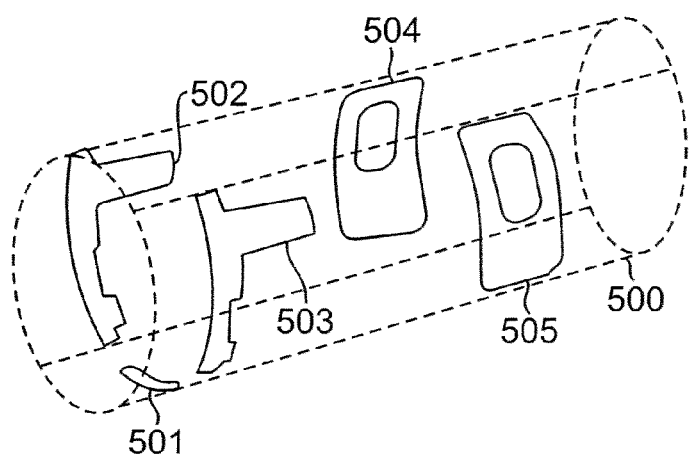
FIG. 5 is an graphical illustration of layups, which may be iteratively applied to a layup structure, in accordance with FIG. 4.

FIG. 4 illustrates an embodiment of integrated layup application system (ILAS) 400, which may be used in conjunction with embodiments of layup kit manufacturing method 100 in FIG. 1 of the present disclosure. FIG. 5 illustrates pre-patterned layups 501-505, which may be functionally similar to pre-patterned layup kit 200 in FIG. 2. Predefined layups 501-505 may be prefabricated in advance of application to layup structure 500, for example, at a layup fabrication facility separate from an airframe fabrication and assembly facility, in which an aircraft may be manufactured using layup structure 500. In the context of FIG. 4, each layup 501-505 in FIG. 5 may be disposed upon a respective carrier to form a layup kit, as represented by respective preselected layup kits 421-423. Layups 501-505 and pre-patterned layup kits 421-423, may be functionally similar to pre-patterned layup 210 and to pre-patterned layup kit 200 in FIG. 2. As with kit 200, pre-patterned layup kits 421-423 may be fabricated inspected, stored, maintained, or delivered as inventory in a manner suitable for just-in-time manufacturing processes, including, without limitation layup kit manufacturing method 100 and integrated production process 300. Subsequently, pre-patterned layup kits 421-423 may be selected and layups 501-505 may be placed iteratively upon layup structure 500 by ILAS 400, in a manner similar to layup kit 200 on layup structure 290.

ILAS 400 may be used in one or more of phases S302, S304, or S306 of production process 300 in FIG. 3, and may employ layup application (hereinafter, saddle) system 410, layup structure assembly 430, and verification-inspection system 440. Non-limiting examples of saddle system 410 may include a layup placement apparatus as may be described in the Related Patent Application, but are not so limited. One or more of layups 401-405 may be a pre-patterned layup, having a feature conforming to a predetermined portion of a particular layup structure 500, for example, at a preselected registration position. A feature may include, without limitation, an aperture, a cutout, a edge, a bevel, or a taper. Pre-patterned layups 501-505 also may be predefined layups, configured to conform to a predetermined contour profile of layup structure 500. A tapered portion of layup structure 500, to which one or more of layups 501-505 may be applied, may have a predetermined contour profile that varies in three-dimensions over a width of a predetermined, pre-patterned layup 501-505.

One or multiple layup kits 421-423 may be fabricated for general application to a corresponding layup structure, as well as for a particular portion of a layup structure, for a particular layup structure, for a particular production run, or for a particular product line or product line variant, and thus may vary in size, shape, layers, composition, or a combination thereof. ILAS 400 also may include kit storage assembly 420. Prefabricated layup kits may be selected to suit current production needs, and stored in kit storage assembly 420. Kit storage assembly 420 can be configured to preserve preselected layup kits 421-423, for example, by controlling ambient temperature, humidity, gas composition, or layup kit storage orientation. As one non-limiting example, kit storage assembly 420 may be implemented as a cassette-type robotic assembly configured to dispense one of preselected layup kits 421-423, to saddle system 410, under the control of a human operator, or of CNC manufacturing system 450. After receiving a preselected layup kit 421-423, saddle system 410 may be positioned relative to layup structure 500, and may cooperate with layup structure assembly 430 to apply the pre-patterned, predefined layup to a corresponding predetermined portion of a layup structure. Layup structure assembly 430 can hold layup structure 500 in a predetermined fiducial location to facilitate precise positioning and placing of a predefined layup by saddle system 410 on the layup structure. One or both of saddle system 410 or layup structure assembly 430 may be controlled, at least in part, by CNC manufacturing system 450. Using layup kits 421-423, layups 501-505 may be iteratively placed on layup structure 500.

FIGS. 6A-6F depict example embodiments of a preselected layup kit including a multi-ply layup, suitable for application to layup structure, such as layup structures 290 or 500. Each of layup kits 600, 620, 640, 650, 660, and 680, include carrier 690 and release layer 691 on which the respective layups may be formed. Kits 600, 620, 640, 650, 660, and 680 may be similar to kit 200, and the corresponding layups (i.e., laminae 601-606, 621-626, 641-646, 651-656, 661-666, and 681-686) may be similar to layup 210. Typically, the respective layups are formed on an obverse surface of carrier 690, with release layer 691 being interposed between carrier 690 and the respective layup. One or more of the layup lamina in one or more of layup kits 600, 620, 640, 650, 660, or 680 may be fabricated from a reinforced fiber-resin matrix material, an intermetallic-matrix composite material, a metal-matrix composite material, a ceramic composite material, or a metal or metal alloy material, although other suitable matrix systems, or metal layers, also may be employed. Also, although the layups in FIGS. 6A-6F are illustrated to include six laminae, the disclosure herein also contemplates more or more or fewer laminae.

Figure 6A:
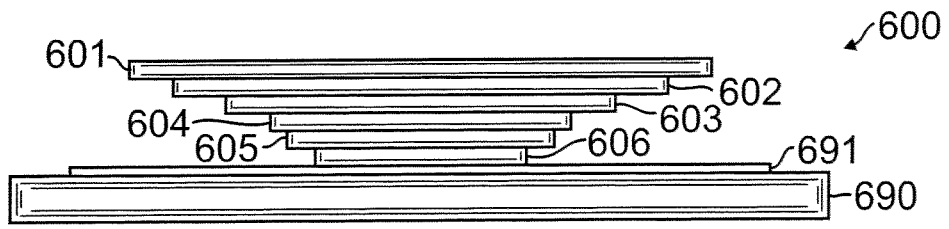
FIG. 6A-6F are graphical illustrations of respective embodiments of the pre-patterned layup kit of FIG. 2 and FIG. 5.

In. FIG. 6A, layup kit 600 is depicted as having a multi-ply layup with six lamina 601-606 formed on an obverse surface of carrier 690. The layup (of lamina 601-606) is arranged in a stacked configuration, with lamina 601 being the uppermost lamina and lamina 606 being the lowermost lamina. As fabricated on carrier 690, lamina 606 may be the first layup ply laid down, proceeding in succession to lamina 601. As placed on a layup structure, such as layup structures 290 or 500, lamina 601 may be disposed most proximately to layup structure 690 and lamina 606 may be the outermost, relative to a layup structure surface.

Figure 6B:
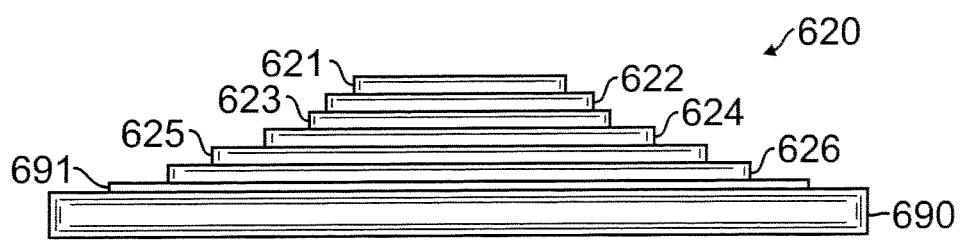

FIG. 6B depicts an alternative embodiment in which layup kit 620 includes a stacked, multi-ply layup having six lamina 621-626 formed on an obverse surface of carrier 690. In layup kit 620, lamina 621 may be the uppermost lamina and lamina 626 may be the lowermost. As fabricated on carrier 690, lamina 626 may be the first layup ply laid down, proceeding in succession to lamina 621. As placed on a layup structure, lamina 621 may be disposed most proximately to layup structure, such as layup structure 290, or layup structure 600, and lamina 626 may be the outermost, relative to a layup structure surface.

In some applications, such as interiorly-applied doublers, an abrupt transition may be acceptable. However, in other application, such as layup applied to layup structure surfaces corresponding to an airframe exterior, it may be desirable to provide a smoothed surface over abrupt lamina transitions, or interlaminar adhesion properties and other properties. A smoothed surface also may improve aerodynamic characteristics for external layups, such as a skin doubler. Examples of an abrupt lamina transition may include a multi-ply, stacked layup or a multi-ply sandwiched layup. Layup kits 600 and 620 may be examples of a layup with a stacked configuration.

Figure 6C:
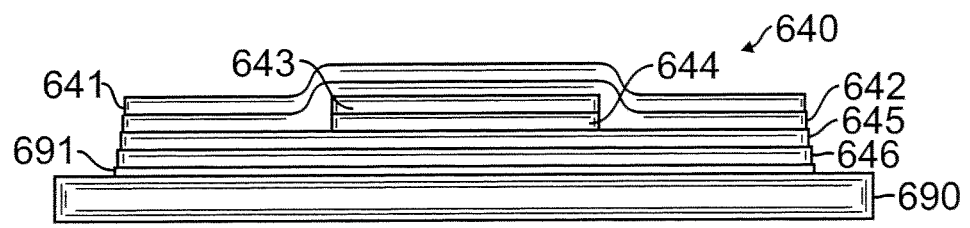

FIG. 6C illustrates layup kit 640, having six lamina 641-646 formed in a sandwich configuration on an obverse surface of carrier 690. In layup kit 640, lamina 641 may be the uppermost lamina and lamina 646 may be the lowermost. As fabricated on carrier 690, lamina 646 may be the first layup ply laid down, proceeding in succession to lamina 641. As placed on a layup structure, lamina 641 may be disposed most proximately to layup structure 290, 500, and lamina 646 may be the outermost, relative to a layup structure surface. Laminae 643 and 644 form a single-stepped transition. Layup kit 640 provides a smoothed surface, for example, by overlapping one or more layers, such as laminae 641 and 642 over the transition from laminae 643-644.

Figure 6D:
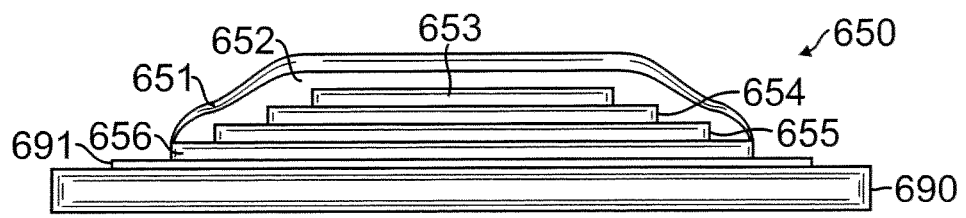

FIG. 6D illustrates layup kit 650, having six lamina 651-656 formed in a sandwich configuration on an obverse surface of carrier 690. In layup kit 650, lamina 651 may be the uppermost lamina and lamina 656 may be the lowermost. As fabricated on carrier 690, lamina 656 may be the first layup ply laid down, proceeding in succession to lamina 651. As placed on a layup structure, lamina 651 may be disposed most proximately to layup structure 290, 500 and lamina 656 may be the outermost, relative to a layup structure surface. Laminae 653 and 654 form a multi-stepped transition. Layup kit 650 provides a smoothed surface, for example, by overlapping one or more layers, such as laminae 651 and 652 over the abrupt transition from laminae 653-654.

Figure 6E:
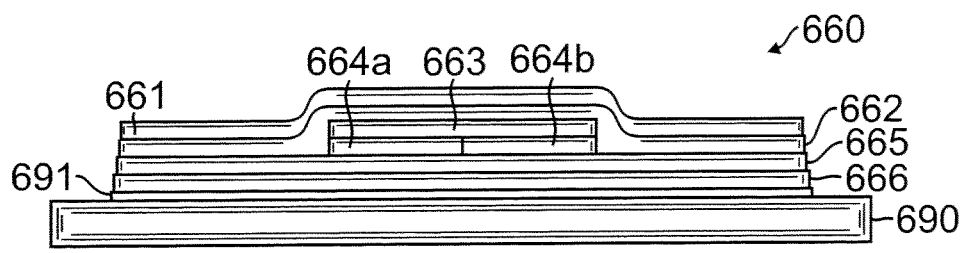

FIG. 6E illustrates layup kit 660, having six lamina 661-666 formed in a sandwich configuration on an obverse surface of carrier 690. In layup kit 660, lamina 661 may be the uppermost lamina and lamina 666 may be the lowermost. As fabricated on carrier 690, lamina 666 may be the first layup ply laid down, proceeding in succession to lamina 661. As placed on a layup structure, lamina 661 may be disposed most proximately to layup structure 290, 500 and lamina 666 may be the outermost, relative to a layup structure surface. Laminae 663 and 664*a-b* can form a single-stepped transition, and laminae 664*a* and 664*b* may present a layer discontinuity within layup kit 660. Lamina 663 may provide an overlapping lamination which may ameliorate inconsistencies related to the depicted layer discontinuity. In addition, layup kit 660 provides a smoothed surface, for example, by overlapping one or more layers, such as laminae 661 and 662 over the transition formed by laminae 663 and 664*a-b*.

Figure 6F:
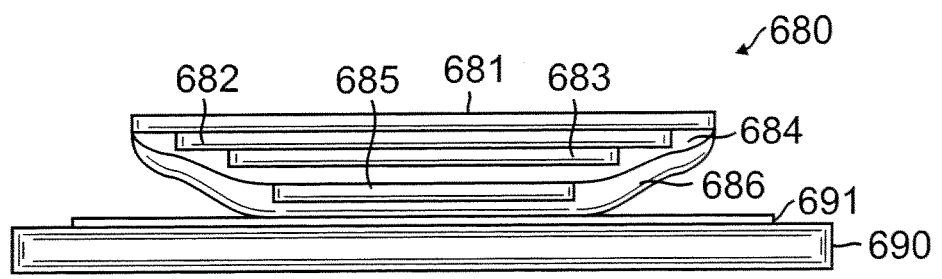

FIG. 6F illustrates layup kit 680, having six lamina 681-686 formed in a sandwich configuration on an obverse surface of carrier 690. In layup kit 680, lamina 686 may be the uppermost lamina, and lamina 681 may be the lowermost. As fabricated on carrier 690, lamina 681 may be the first layup ply laid down, proceeding in succession to lamina 686. As placed on layup structure 290, 500, lamina 686 may be disposed most proximately to layup structure 290, 500, and lamina 681 may be the outermost, relative to a layup structure surface. Laminae 684-686 form a multi-stepped transition. Layup kit 680 provides a smoothed surface, for example, by overlapping one or more layers, such as laminae 683 over laminae 684-686. Lamina 682 may be applied over laminae 683-686, and create another discontinuity.

Lamina 681 may be provided as a smoothing layer over lamina 682, which also may have the practical effect of interlocking laminae 681-682 with laminae 683-686. Laminae 683-686 may represent, for example, a fuselage layup, and laminae 681-682 may represent, for example, a skin doubler layup applied over the layup structure 290, 500. Laminae 681-682 and laminae 683-686 are depicted as being fabricated on a single carrier. However, apparatus and methods in the present disclosure contemplate a first layup being applied, at least in part, on a second layup, so that laminae 681-682 may be applied subsequently to laminae 683-686. In such an application, laminae 683-686 may be initially applied to a layup structure using a first layup kit, with laminae 681-682 representing a second layup being applied to at least a portion of the first layup 683-686.

In selected applications, it may be desirable to provide a forming tool having a surface modified to receive and or accommodate the innermost lamina of a multi-play layup, such as the respective layups of kits 600, 620, 640, 650, 660, or 680, which may exhibit a blistered, protruding, or bulging surface. In addition, the outermost lamina of layups, which may be proximate to an outer aerodynamic surface of an aircraft, may be worked to smooth and fair to the outer layup structure surface, and thereby reduce aerodynamic drag, amongst other benefits.

Figure 7A:
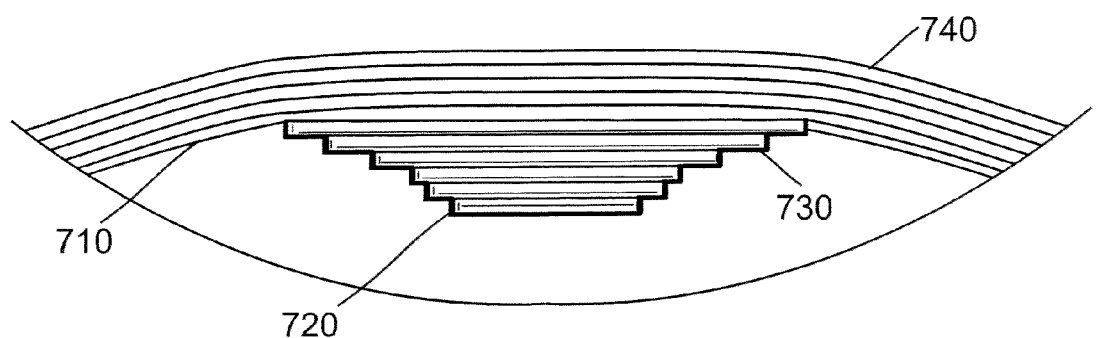
FIGS. 7A-7D illustrate a contoured surface forming tool useable in conjunction with embodiments illustrated in FIGS. 1-5 and FIGS. 6A-6F.

In FIG. 7A, contoured mandrel 710 represents a forming tool having a surface modified to accept multi-ply layup 720. Mandrel 710 may be an implementation of, for example, layup structure 290 and layup structure 500 in FIGS. 2 and 5, respectively. Layup 720 may be similar to layup 210 of layup kit 200 in FIG. 2, layups 501-505 in FIG. 2, or one of the layup of kits 600, 620, 640, 650, 660, 680 in FIG. 6A-F, for example, and may have a multi-stepped, discontinuous surface, similar to the layup illustrated in FIG. 6B. Such a contoured-surface forming tool arrangement may be desirable where a multi-ply layup 720, such as a skin doubler, may be placed on a door, a port, or a hatch aperture on an airframe portion corresponding to mandrel 710, and where it also is desirable to maintain the fair of the resulting airframe surface relative to the rest of the airframe structure. One or more of layup kit manufacturing method 100, integrated production process 300, or ILAS 400, may be used in conjunction with a contoured surface forming tool, such as mandrel 710.

In FIG. 7A, contoured mandrel 710 represents a forming tool having a surface modified to accept multi-ply layup 720. Layup 720 may be similar to that provided with layup kit 620 in FIG. 6B, and have a multi-stepped, discontinuous surface. Such a contoured-surface forming tool arrangement may be desirable where a multi-ply layup 720, such as a skin doubler, may be placed on a door, a port, or a hatch aperture on an airframe portion corresponding to mandrel 710, and where it also is desirable to maintain the fair of the resulting airframe surface relative to the rest of the airframe structure. ILAS 400 process may be used in conjunction with a contoured surface forming tool, such as mandrel 710.

Figure 7B:
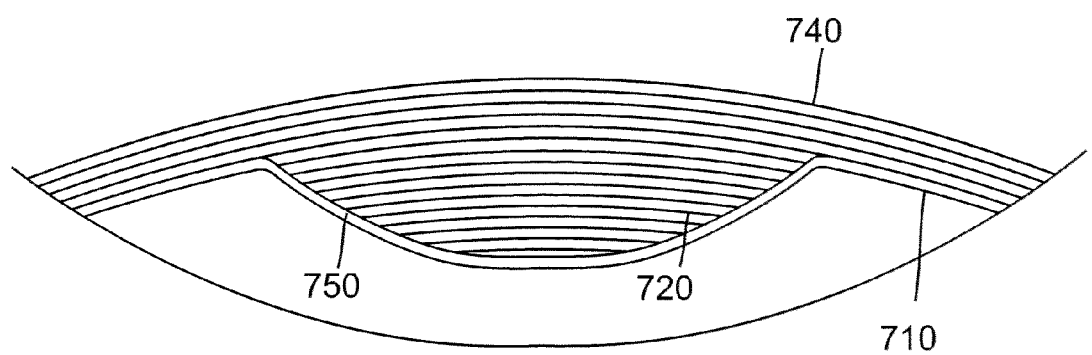

As shown in FIG. 7A, an embodiment has layup 720 located directly onto mandrel 720. Then the AFP may apply 740 over the layup structure 500. Another embodiment shown in FIG. 7B, has at least one ply 750 applied to mandrel 710 by AFP prior to locating layup 720 and then the balance of the plies 740 are applied by AFP.

Figure 7C:
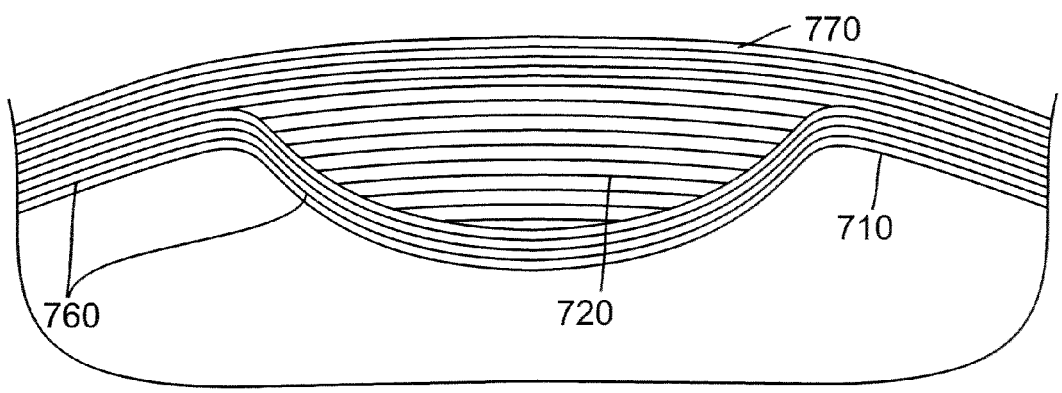

Another embodiment, shown in FIG. 7C, may have a plurality of plies 760 applied by AFP to mandrel 710 prior to location of layup 720 and then the balance of the layers 770 applied by AFP.

Figure 7D:
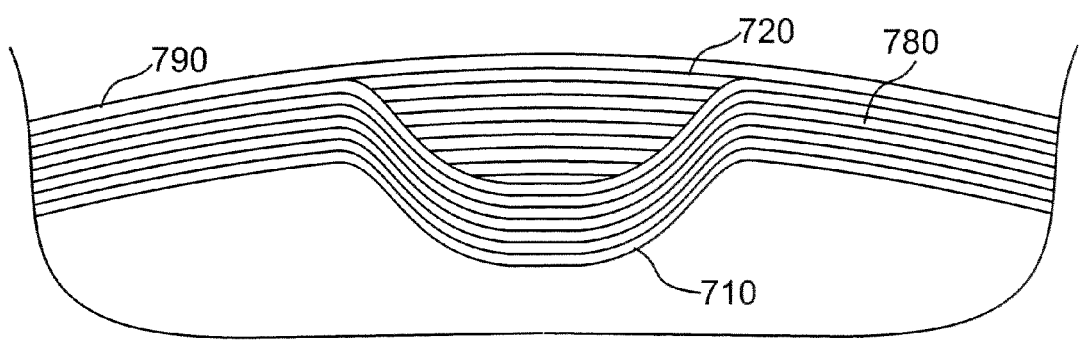

Another embodiment, shown in FIG. 7D, has substantially all of the plies 780 applied to mandrel 710 by AFP and the layup 720 applied plies 780 and then at least on ply 790 applied by AFP.

As shown in FIG. 7A, mandrel 1010 includes mandrel accommodation 730 to its outer surface to accommodate layup 720. Mandrel accommodation 730 is sized and shaped to couple to the corresponding preselected layup 720. Mandrel accommodation 730 permits location of layup 720 on layup structure 500 according to the previously described embodiments resulting in a smooth outer surface without blisters, bulges or protrusions on the outer surface of the completed layup structure 500. The blisters, bulges or protrusions are located on the inner surface of the completed layup structure 500.

Figure 8:
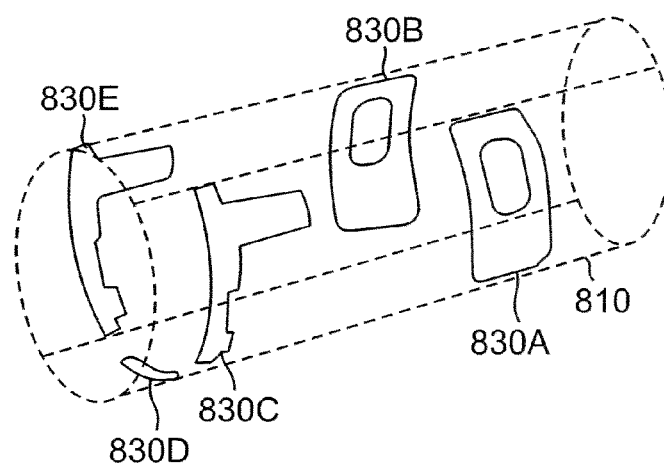
FIG. 8 illustrates multiple layups, which may be applied iteratively to a layup structure, in accordance with the teachings of present disclosure.

Mandrel accommodation 730 may be located and/or oriented in any suitable fashion to couple with its corresponding preselected layup 720. An embodiment as shown in FIG. 8, has five mandrel accommodations 830(a-e) located on mandrel 810.

Embodiments described above illustrate but do not limit the disclosure. It should also be understood that numerous modifications and variations are possible in accordance with the principles of the present disclosure. Accordingly, the scope of the disclosure is defined only by the following claims.

We claim:

1. A method for manufacturing a kit for a part for an airframe, comprising:
    applying a layup release layer to an obverse surface of a flexible carrier;
    compacting the layup release layer and the flexible carrier in a vacuum bag;
    laying down a first pre-patterned lamina in a first lamina orientation on the compacted release layer of the flexible carrier and iteratively laying down each of a plurality of subsequent laminae in a respective subsequent lamina orientation on the first pre-patterned lamina so as to fabricate a pre-patterned layup having a preselected pattern shaped to accommodate an airframe topological feature;
    wherein the pre-patterned layup is laid down in a predetermined orientation indexed to the flexible carrier so as to define a spatial relationship between the pre-patterned layup and the flexible carrier relative to a known fiducial location; and
    performing a second compacting of the pre-patterned layup, the release layer, and the flexible carrier in a vacuum bag wherein the flexible carrier and the pre-patterned layup comprise a kit for an airframe part.

2. The method of claim 1, wherein fabricating the pre-patterned layup further comprises:
    cutting the preselected pattern into at least one prepreg lamina to fabricate the first pre-patterned lamina.

3. The method of claim 1, further comprising,
    after the second compacting, iteratively laying down additional pre-patterned laminae on the pre-patterned layup in a respective lamina orientation indexed to the flexible carrier; and
    compacting all pre-patterned laminae, the release layer, and the flexible carrier in a vacuum bag for at least 5 minutes.

4. The method of claim 2, wherein fabricating the pre-patterned layup further comprises:
    pre-trimming the first pre-patterned lamina to fit to a preselected target region; and
    conforming the first pre-patterned lamina to an airframe contour corresponding to the preselected target region.

5. The method of claim 1, wherein the compacting includes vacuum-compacting for at least about 5 minutes.

6. The method of claim 5, further comprising:
    inspecting selected ones of the pre-patterned laminae for a ply characteristic, a ply edge overlap, a bonding characteristic, an interlaminar characteristic, or a combination thereof.

7. The method of claim 1 wherein the flexible carrier comprises an indexing element.

8. The method of claim 7 wherein the pre-patterned layup comprises multiple prepreg laminae, wherein at least one of the multiple laminae includes the pre-selected pattern, and wherein selected ones of the multiple laminae are laid down on the flexible carrier in respective lamina orientations relative to the indexing element.

9. The method of claim 1 wherein the airframe topological feature further comprises an airframe feature selected from the group consisting of a fuselage, a wing, a canard, a cone, a door, a radome, a fin, a nose, an empennage, a nacelle, a strake, a spar, a fairing, a hatch, and a port.

10. A method for manufacturing a layup part for an airframe, wherein the manufacturing method is part of an aircraft assembly process having a production phase, the method comprising the steps of:
    applying a layup release layer to an obverse surface of a flexible carrier;
    compacting the layup release layer and the flexible carrier in a vacuum bag;
    laying down a first pre-patterned lamina in a first lamina orientation on the compacted layup release layer of the flexible carrier and iteratively laying down each of a plurality of subsequent laminae in a respective subsequent lamina orientation so as to fabricate a pre-patterned layup, in the production phase, into an airframe topological feature,
    wherein the airframe topological feature further comprises an airframe feature selected from the group consisting of a fuselage, a wing, a canard, a cone, a door, a radome, a fin, a nose, an empennage, a nacelle, a strake, a spar, a fairing, a hatch, and a port; and
    wherein the pre-patterned layup is laid down in a predetermined layup orientation indexed to the flexible carrier, in the production phase, wherein the flexible carrier further comprises a sheet of metal material;
    supporting the pre-patterned layup on the flexible carrier; and
    compacting the pre-patterned layup and the flexible carrier in a vacuum bag.

11. The method of claim 10, wherein the pre-patterned layup includes at least one ply.

12. The method of claim 10, wherein fabricating the pre-patterned layup further comprises:
    cutting the preselected pattern into at least one prepreg lamina to fabricate the first pre-patterned lamina.

13. The method of claim 12, wherein fabricating the pre-patterned layup further comprises:
    pre-trimming the first pre-patterned lamina to fit to a preselected target region; and
    conforming the first pre-patterned lamina to an airframe contour corresponding to the preselected target region.

14. A method for manufacturing a layup assembly for an airframe, wherein the method for manufacturing is part of an aircraft assembly process having a pre-production phase, a production phase, and a post-production phase, the method comprising:
    applying a layup release layer to an obverse surface of a flexible carrier;
    compacting the layup release layer and the flexible carrier in a vacuum bag;
    laying down a first pre-patterned lamina in a first lamina orientation on the compacted release layer of the flexible carrier and iteratively laying down each of a plurality of subsequent laminae in a respective subsequent lamina orientation on the flexible carrier so as to fabricate a pre-patterned layup into an airframe topological feature, in the production phase, the pre-patterned layup having a preselected pattern shaped to accommodate an airframe topological feature, wherein the airframe topological feature further comprises an airframe feature selected from the group consisting of a fuselage, a wing, a canard, a cone, a door, a radome, a fin, a nose, an empennage, a nacelle, a strake, a spar, a fairing, a hatch, and a port;

wherein the pre-patterned layup is laid down in a predetermined layup orientation indexed to the flexible carrier wherein the flexible carrier further comprises a sheet of metal material, in the production phase;

supporting the pre-patterned layup on the flexible carrier; and compacting the pre-patterned layup and the flexible carrier in a vacuum bag.

15. The method of claim 14 further comprising the steps of:

selecting a component fabricated by a third party in the pre-production phase; and using the component in an aircraft assembly.

16. The method of claim 15 wherein the step of using further comprises using the component in an aircraft subassembly.

17. The method of claim 14 further comprising the step of:

designing the pre-patterned layup for the layup placement in the pre-production phase.

18. The method of claim 14 further comprising the step of:

replacing a defective lamina using the pre-patterned layup for a layup structure in the post-production phase.

\* \* \* \* \*